US012656593B2

(12) United States Patent
Hamner et al.

(10) Patent No.: US 12,656,593 B2
(45) Date of Patent: Jun. 16, 2026

(54) METROLOGY SYSTEM UTILIZING SCAN LENS FOR POINTS-FROM-FOCUS TYPE PROCESSES

(71) Applicant: Mitutoyo Corporation, Kanagawa-ken (JP)

(72) Inventors: Christopher Richard Hamner, Kirkland, WA (US); Vahan Senekerimyan, Kirkland, WA (US)

(73) Assignee: Mitutoyo Corporation, Kanagawa-Ken (JP)

( * ) Notice: Subject to any disclaimer, the term of this patent is extended or adjusted under 35 U.S.C. 154(b) by 106 days.

(21) Appl. No.: 18/886,879

(22) Filed: Sep. 16, 2024

(65) Prior Publication Data
US 2026/0079335 A1 Mar. 19, 2026

(51) Int. Cl.
*G02B 21/24* (2006.01)
*G02B 21/00* (2006.01)
*H04N 23/55* (2023.01)
*H04N 23/56* (2023.01)
(Continued)

(52) U.S. Cl.
CPC ....... *G02B 21/241* (2013.01); *G02B 21/0036* (2013.01); *H04N 23/55* (2023.01); *H04N 23/56* (2023.01); *H04N 23/671* (2023.01); *H04N 23/672* (2023.01); *H04N 23/676* (2023.01); *H04N 23/74* (2023.01)

(58) Field of Classification Search
CPC .. G02B 21/241; G02B 21/0036; H04N 23/55; H04N 23/56; H04N 23/671; H04N 23/672; H04N 23/676; H04N 23/74
See application file for complete search history.

(56) References Cited

U.S. PATENT DOCUMENTS

| | | |
|---|---|---|
| 5,615,013 A | 3/1997 | Rueb et al. |
| 6,542,180 B1 | 4/2003 | Wasserman et al. |
| 7,030,351 B2 | 4/2006 | Wasserman et al. |

(Continued)

OTHER PUBLICATIONS

Mermillod-Blondin et al., "High speed varifocal imaging with a tunable acoustic gradient index of refraction lens," *Optics Letters* 33(18):2146-2148, Sep. 15, 2008, (3 pages).

(Continued)

*Primary Examiner* — Nasim N Nirjhar
(74) *Attorney, Agent, or Firm* — Seed Intellectual Property Law Group LLP

(57) ABSTRACT
A metrology system is provided including a lighting configuration, a camera, a scan lens, a mirror configuration and a variable focal length (VFL) lens. The mirror configuration is utilized to adjust to different imaged fields of view as corresponding to different view positions through the scan lens. For each imaged field of view, the camera is utilized to acquire a corresponding image set including images of the workpiece, wherein the VFL lens is controlled to rapidly vary the focus position of the metrology system for acquiring the images (e.g., wherein each image corresponds to different focus position data). For each corresponding image set, focus position data is determined that indicates three dimensional positions of a plurality of surface points on the workpiece that are within the corresponding field of view (e.g., enabling determinations of measurements of workpiece features that are within the corresponding field of view).

20 Claims, 9 Drawing Sheets

(51) Int. Cl.
    *H04N 23/67*         (2023.01)
    *H04N 23/74*         (2023.01)

(56)         References Cited

U.S. PATENT DOCUMENTS

| | | |
|---|---|---|
| 7,324,682 B2 | 1/2008 | Wasserman |
| 7,454,053 B2 | 11/2008 | Bryll et al. |
| 7,570,795 B2 | 8/2009 | Yu et al. |
| 7,627,162 B2 | 12/2009 | Blanford et al. |
| 8,111,905 B2 | 2/2012 | Campbell |
| 8,111,938 B2 | 2/2012 | Bryll et al. |
| 8,194,307 B2 | 6/2012 | Arnold et al. |
| 8,581,162 B2 | 11/2013 | Campbell |
| 9,060,117 B2 | 6/2015 | Bryll et al. |
| 9,143,674 B2 | 9/2015 | Gladnick |
| 9,442,075 B2 | 9/2016 | Rueb |
| 9,726,876 B2 | 8/2017 | Bryll |
| 9,736,355 B1 | 8/2017 | Bryll |
| 9,930,243 B2 | 3/2018 | Gladnick et al. |
| 10,101,572 B2 | 10/2018 | Bryll et al. |
| 10,178,321 B2 | 1/2019 | Emtman et al. |
| 10,880,468 B1 | 12/2020 | Bryll |
| 11,119,382 B2 | 9/2021 | Gladnick |
| 11,328,409 B2 | 5/2022 | Emtman |
| 11,499,817 B2 | 11/2022 | Eiles |
| 11,587,246 B2 | 2/2023 | Campbell et al. |
| 2010/0292947 A1 | 11/2010 | Buk |
| 2017/0078549 A1* | 3/2017 | Emtman ................ H04N 23/10 |
| 2017/0285318 A1* | 10/2017 | Cho ..................... G02B 21/025 |
| 2018/0263482 A1* | 9/2018 | Guan ...................... F21V 14/04 |
| 2020/0209519 A1* | 7/2020 | Gladnick ............. H04N 17/002 |
| 2023/0061635 A1* | 3/2023 | Riechel ............. B23K 26/0648 |
| 2023/0421909 A1 | 12/2023 | Hamner |

OTHER PUBLICATIONS

Mitutoyo Corporation & Micro Encoder Inc., "QVPAK—3D CNC Vision Measuring Machine—User's Guide," Manual No. 99MCB225A, Version 7, Series No. 359, Jan. 2003. (326 pages).

Sill Optics, "Laser Optics: F-Theta Lenses—Beam Expanders—Aspheric Lenses—Trapped Ion Lenses—Custom Optics," Wendelstein, Germany, Sep. 2023. (12 pages).

Sill Optics, "S4LFT7012-292: F-Theta, color corrected, 515-589 nm," Data Sheet, Wendelstein, Germany, Sep. 4, 2023. (2 pages).

Vilar et al., "Fast topographic optical imaging using encoded search focal scan," *Nature Communications* 15:2065, Mar. 7, 2024. (9 pages).

* cited by examiner

METROLOGY SYSTEM UTILIZING SCAN LENS FOR POINTS-FROM-FOCUS TYPE PROCESSES

BACKGROUND

Technical Field

This disclosure relates to precision metrology, and more particularly to metrology systems in which images may be acquired at different focus positions.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC based vision systems and QVPAK® software available from Mitutoyo America Corporation (MAC), located in Aurora, Illinois. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope type optical system and moves the stage to provide inspection images of workpieces.

Accuracies in the micron or sub-micron range are often desired in such systems. This is particularly challenging with regard to Z-height measurements/positions (e.g., such as may be utilized for reconstructing a 3-dimensional shape of at least part of a surface of a workpiece). Z-height measurements/positions (along the optical axis of the camera system) are derived in some implementations from a "best focus" position (e.g., as part of a points-from-focus type process). Determining a best focus position is a relatively complex process that generally depends on combining and/or comparing information derived from multiple images. For some workpieces, such inspection processes may also require multiple movements of the precision stage for inspecting different workpiece areas, which may result in a slower overall process. A system that can provide improvements with regard to such issues would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect, a metrology system is provided including a lighting configuration, a camera, a scan lens, a mirror configuration, a variable focal length (VFL) lens, one or more processors, and a memory. The camera is configured to receive image light transmitted along an imaging optical path and to provide images of a workpiece that is illuminated by the lighting configuration. The scan lens is included in the imaging optical path and is configured to input image light arising from the workpiece as illuminated by the lighting configuration. The mirror configuration is included in the imaging optical path and is configured to direct image light from the scan lens along the imaging optical path. The mirror configuration comprises one or more mirrors that are configured to be adjusted to adjust an imaged field of view as corresponding to a view position through the scan lens. The VFL lens is included in the imaging optical path, wherein image light travels from the mirror configuration along the imaging optical path and through the VFL lens to the camera. The VFL lens is configured to be controlled to vary an optical power of the VFL lens so as to vary a focus position of the metrology system.

The memory is coupled to the one or more processors and stores program instructions that when executed by the one or more processors cause the one or more processors to at least: control the lighting configuration to provide light for illuminating the workpiece; utilize the camera to acquire a first image set comprising a first plurality of images of the workpiece in accordance with a first imaged field of view as corresponding to a first view position through the scan lens, wherein the VFL lens is controlled to vary the focus position of the metrology system for acquiring the images of the first image set; utilize the mirror configuration to adjust to a second imaged field of view as corresponding to a second view position through the scan lens; and utilize the camera to acquire a second image set comprising a second plurality of images of the workpiece in accordance with the second imaged field of view as corresponding to the second view position through the scan lens, wherein the VFL lens is controlled to vary the focus position of the metrology system for acquiring the images of the second image set.

In various implementations, first focus position data is determined based at least in part on an analysis of the images of the first image set, wherein the first focus position data indicates three dimensional positions of a plurality of surface points on the workpiece that are within the first field of view. In addition, second focus position data is determined based at least in part on an analysis of the images of the second image set, wherein the second focus position data indicates three dimensional positions of a plurality of surface points on the workpiece that are within the second field of view. In various implementations, the first focus position data may be utilized to determine three dimensional positions of a plurality of surface points on the workpiece that are within the first field of view, and the second focus position data may be utilized to determine three dimensional positions of a plurality of surface points on the workpiece that are within the second field of view.

In accordance with another aspect, a method is provided for operating the metrology system. The method includes controlling the lighting configuration to provide light for illuminating the workpiece. The camera is utilized to acquire a first image set comprising a first plurality of images of the workpiece in accordance with a first imaged field of view as corresponding to a first view position through the scan lens, wherein the VFL lens is controlled to vary the focus position of the metrology system for acquiring the images of the first image set. The mirror configuration is then utilized to adjust to a second imaged field of view as corresponding to a second view position through the scan lens. The camera is then utilized to acquire a second image set comprising a second plurality of images of the workpiece in accordance with the second imaged field of view as corresponding to the second view position through the scan lens, wherein the VFL lens is controlled to vary the focus position of the metrology system for acquiring the images of the second image set.

DETAILED DESCRIPTION

Figure 1:
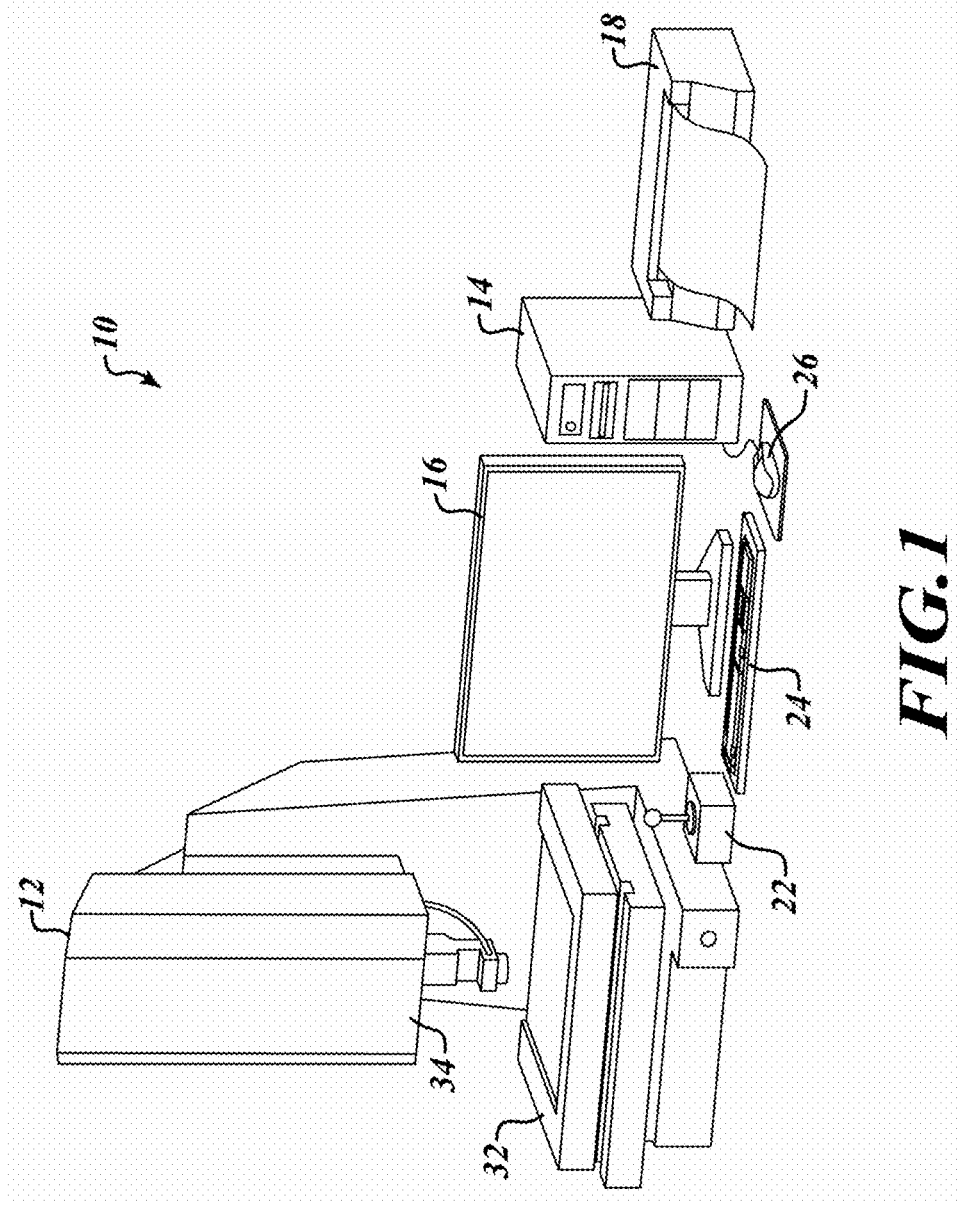
FIG. 1 is a diagram showing various typical components of a general-purpose precision machine vision metrology system.

FIG. 1 is a diagram showing various typical components of a general-purpose precision machine vision metrology system 10. The machine vision metrology system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision metrology system 10. It will be appreciated that, in various implementations, a touchscreen tablet or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a scan lens and/or a zoom lens and/or an interchangeable objective lens. The scan lens, zoom lens and/or interchangeable objective lens generally provide various magnifications for the images provided by the optical imaging system 34. Various implementations of a machine vision metrology system 10 are also described in commonly assigned U.S. Pat. Nos. 7,454,053; 7,324,682; 8,111,905; and 8,111,938, each of which is hereby incorporated herein by reference in its entirety.

As will be described in more detail below, in various implementations it may be desirable for a points-from-focus type processes as performed by a metrology system to be able to quickly measure large volumes of high aspect ratio workpieces (e.g., which in some instances may be relatively wide and flat). For some workpieces, there may be certain features for which it is desirable to measure the locations, heights, and/or relative distances between the features. In some instances, the measurement volume for a workpiece may be beyond a single typical field of view (FOV) size (e.g., for a typical objective lens that might be utilized for such processes). As a specific numerical example, for a measurement volume of roughly 25 mm by 25 mm and 0.5 mm high, if a 10 μm accuracy/resolution is desired, such may be beyond a single FOV size for a typical objective lens that might be utilized. In relation to such issues, while it may be possible to move to additional FOVs (e.g., on a workpiece) utilizing mechanical motion of a stage (e.g., utilizing a movement mechanism to mechanically move a stage as will be described in more detail below with respect to FIG. 2), in various implementations the inertial motion of the stage may be slower than desired (e.g., such as on the order of 0.5 seconds for certain movements, as may limit the possible overall throughput of the measurements).

To address such issues, in accordance with principles as described herein, the metrology system (e.g., as described in more detail below with respect to FIGS. 2 and 3) includes a mirror configuration MC that is utilized to rapidly adjust (e.g., on a millisecond timescale) to different fields of view as corresponding to different view positions through a scan lens. For each field of view, a variable focal length (VFL) lens is controlled to rapidly vary the focus position of the metrology system, and a camera acquires an image set (e.g., as part of a points-from-focus type process). For example, focus position data may be determined based on an analysis of images in an image set, and the focus position data may indicate three dimensional positions of a plurality of surface points on the workpiece that are within the corresponding imaged field of view. In addition, in certain implementations, the desired highest accuracy measurements may primarily be within each of the imaged fields of view (e.g., such as for distance measurements and/or relative height measurements between certain features within a field of view). Also, in some implementations such measurements may only be desired for certain areas of a workpiece (e.g., a workpiece where the desired features for measurement are primarily located near a perimeter and/or in other separated areas on the workpiece, etc.) It will be appreciated that in such instances, the mirror configuration MC may be utilized with the scan lens to rapidly adjust to the desired fields of view and for which mechanical movement of the stage across such distances is not required. It will be appreciated that in various implementations the described configuration may generally allow for higher throughput as corresponding to more rapid measurements of workpieces (e.g., wherein the mirror configuration MC may be utilized with the scan lens to rapidly adjust to all desired fields of view, and the VFL lens may be utilized to rapidly obtain the images for the points-from-focus type process for the measurements of the workpiece, etc.).

Figure 2:
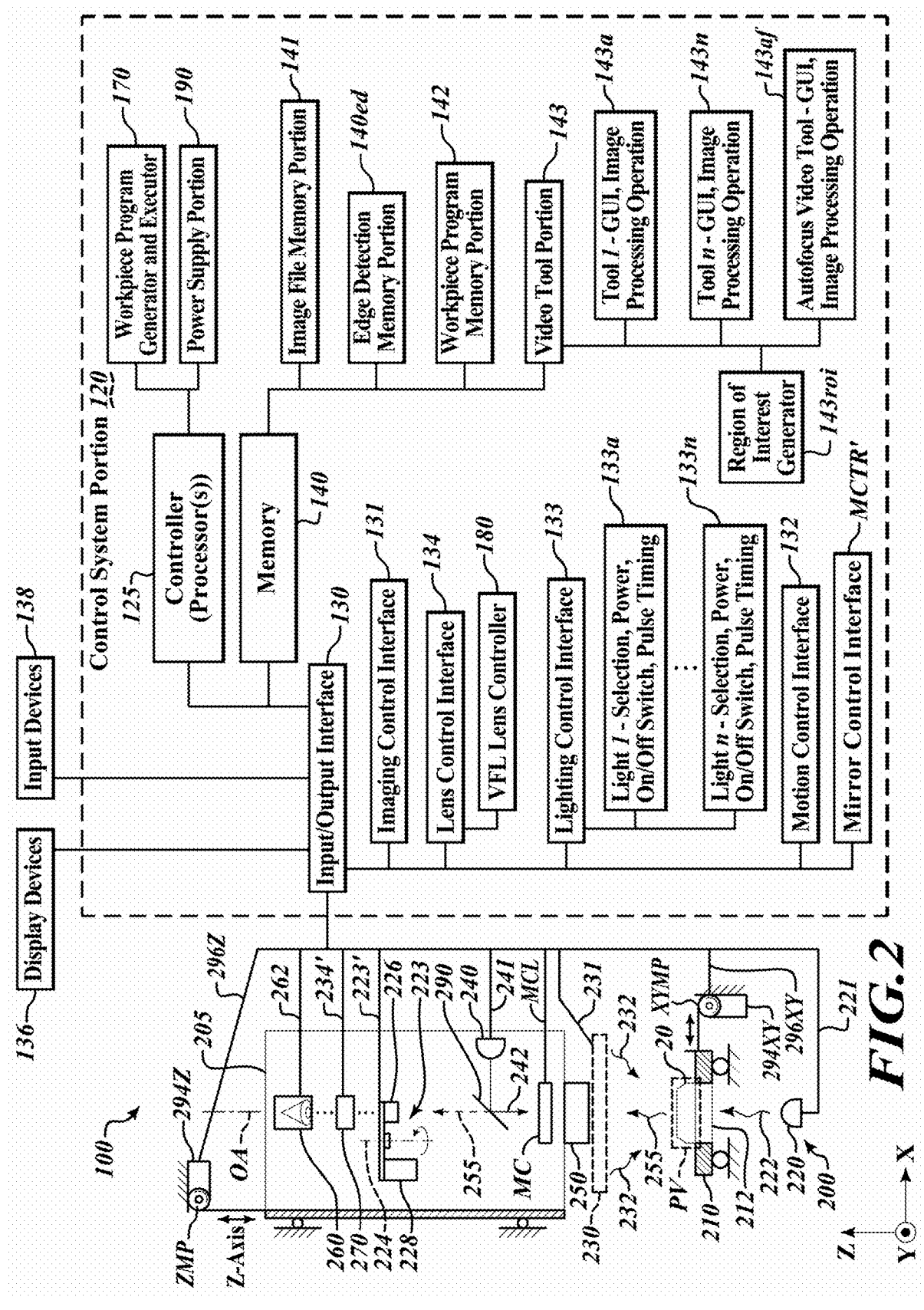
FIG. 2 is a block diagram of a control system portion and a vision components portion of a machine vision metrology system similar to that of FIG. 1 and including certain features as described herein.

FIG. 2 is a block diagram of a control system portion 120 and a vision components portion 200 of a machine vision metrology system 100 similar to the machine vision metrology system of FIG. 1. As will be described in more detail below, the control system portion 120 is utilized to control the vision components portion 200. The vision components portion 200 includes an optical assembly portion 205, light sources 220, 230, 240, and a workpiece stage 210 having a central transparent portion 212. In various implementations, the workpiece stage 210 (e.g., which may be similar or identical to the stage 32 of FIG. 1) is controllably movable (e.g., utilizing a motor) along at least one or both of the X and Y axes that lie in a plane that is generally parallel to the surface of the stage where a workpiece 20 may be positioned.

The workpiece stage 210 is controllably movable along the X- and Y-axes by a movement mechanism 294XY configured to change a stage position of the workpiece stage 210 relative to at least part of the optical assembly portion 205. In various implementations, the movement mechanism 294XY (e.g., a controllable motor) may drive an actuator to move the workpiece stage 210 (e.g., to move the workpiece 20) relative to the optical assembly portion 205 including the scan lens 250 of the optical assembly portion 205 (e.g., so that a field of view (FOV) of the optical assembly portion 205 of the imaging system is moved to different parts of the workpiece 20, etc. for acquiring different images at different image positions, such as for acquiring images of different features of the workpiece 20).

An encoder-based measurement portion XYMP (e.g., as included in or attached to the movement mechanism 294XY or otherwise coupled to or proximate to the workpiece stage 210) includes one or more position encoders, and provides position measurements indicative of the position of the workpiece stage 210 (e.g., relative to the optical assembly portion 205). Specifically, the encoder-based measurement portion XYMP may provide position measurements indicative of the stage position relative to at least part of the optical assembly portion 205. The movement mechanism 294XY (e.g., a controllable motor) and the encoder-based measurement portion XYMP are connected to an input/output interface 130 via a signal line 296XY (e.g., which may include separate signal line portions for providing control signals to and/or for receiving signals from the movement mechanism 294XY and the encoder-based measurement portion XYMP).

The optical assembly portion 205 includes a camera system 260 (i.e., including a camera), a variable focal length (VFL) lens 270, a mirror configuration MC, and a scan lens 250. In various implementations, the VFL lens 270 may be a tunable acoustic gradient index of refraction ("TAG" or "TAGLENS") lens that creates a lensing effect using sound waves in a fluid medium. The sound waves may be created by application of an electrical field at a resonant frequency to a piezoelectric tube surrounding the fluid medium to create a time varying density and index of refraction profile in the lens's fluid, which modulates its optical power and thereby the focal length (or effective focus position) of its optical system. The TAG lens may be used to periodically sweep a range of focal lengths (i.e., to periodically modulate its optical power) at a resonant frequency greater than 30 kHz, or greater than 70 kHz, or greater than 100 kHz, or greater than 400 kHz, up to 1.0 MHz for example, at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. TAG (aka TAGLENS) lenses and related controllable signal generators are available, for example, from Mitutoyo Corporation of Kanagawa, Japan. As a specific example, certain TAG lenses are capable of periodic modulation having a modulation frequency of up to 1.0 MHz. Various aspects of operating principles and applications of TAG lenses are described in greater detail in U.S. Pat. Nos. 10,178,321; 10,101,572; 9,930,243; 9,736,355; 9,726,876; 9,143,674; 8,194,307; and 7,627,162, each of which is hereby incorporated herein by reference in its entirety.

In various implementations, the optical assembly portion 205 may further include a turret lens assembly 223 having lenses 226 and 228. The control system portion 120 may control the turret lens assembly 223 to rotate along axis 224 to select a turret lens through a signal line or bus 223' to alter an image magnification. As an alternative to the turret lens assembly, in various implementations, a fixed or manually interchangeable magnification-altering lens, or a zoom lens configuration, or the like, may be included. In various implementations, the scan lens 250 may be interchangeable with other scan lenses and/or with an objective lens, such as may be selected from a set of fixed magnification objective lenses (e.g., a set of objective lenses corresponding to magnifications such as 0.5×, 1×, 2× or 2.5×, 5×, 7.5×, 10×, 20× or 25×, 50×, 100×, etc.).

The optical assembly portion 205 is controllably movable along a Z-axis that is generally orthogonal to the X- and Y-axes by using a movement mechanism 294Z (e.g., a controllable motor) that drives an actuator to move the optical assembly portion 205 along the Z-axis to change the focus of the image of the workpiece 20. An encoder-based measurement portion ZMP (e.g., as included in or attached to the movement mechanism 294Z or otherwise coupled to or proximate to the optical assembly portion 205) includes one or more position encoders, and provides position measurements indicative of the position of the optical assembly portion 205 (e.g., relative to the stage 210 on which the workpiece 20 is located). The movement mechanism 294Z and the encoder based measurement portion ZMP are connected to an input/output interface 130 via a signal line 296Z (e.g., which may include separate signal line portions for providing control signals to and/or for receiving signals from the movement mechanism 294Z and the encoder-based measurement portion ZMP). For example, the control signals may be provided through the input/output interface 130 to control the movement mechanism 294Z to move the optical assembly portion 205 to change the focus of the image (e.g., to change the focus position of the objective lens 250 relative to the workpiece 20).

As will be described in more detail below, to change the focus of the image over a smaller range, or as an alternative to moving the optical assembly portion 205, the VFL (TAG) lens 270 may be controlled via a signal line 234' by a lens control interface 134 to periodically modulate the optical power of the VFL lens 270 and thus modulate an effective focus position of the optical assembly portion 205 of the metrology system 100. The lens control interface 134 may include a VFL lens controller 180, as described in greater detail below. A workpiece 20 may be placed on the workpiece stage 210. The workpiece stage 210 may be controlled to move relative to the optical assembly portion 205 (e.g., to move along one or both of the X and Y axes directions) and/or the optical assembly portion 205 may be controlled to move relative to the workpiece stage (e.g., along one or both of the X and Y axes directions), such that a field of view associated with a particular view position through the scan lens 250 moves between locations on a workpiece 20, and/or among a plurality of workpieces 20, etc.

One or more of a stage light source 220, a lighting configuration 230 (e.g., as corresponding to a type of ring or dome light), and a coaxial light source 240 may emit source light 222, 232, and/or 242, respectively, to illuminate a workpiece 20 or workpieces 20. Various light sources (e.g., the light sources 220, 230, 240) may be connected to the lighting control interface 133 of the control system portion 120 through associated signal lines (e.g., busses 221, 231, 241, respectively).

In various implementations, a lighting configuration may include one or more of the light sources 220, 230 and/or 240, and may be formed and/or operated in accordance with various principles. In various exemplary embodiments, pulsed (e.g., strobed) illumination may be used. For example, during an image exposure, a lighting configuration (e.g., including the lighting configuration 230) may emit strobed source light 232 toward a volume PV (e.g., a PFF volume) in which at least part of the workpiece 20 is located. In another example, during an image exposure, the lighting configuration (e.g., including the coaxial light source 240) may emit strobed source light 242 along a path including a beam splitter 290 (e.g., a partial mirror/reflective surface). The source light 232, 242 is reflected from the workpiece 20 as image light 255, and the image light used for imaging passes through the scan lens 250, the mirror configuration MC, the turret lens assembly 223 and the VFL (TAG) lens 270, and is gathered by the camera system 260. A workpiece image exposure, which includes the image of the workpiece(s) 20, is captured by the camera system 260, and is output on a signal line 262 to the control system portion 120.

In various implementations, a lighting configuration is configured to illuminate the workpiece 20 for producing image light 255. As noted above, the scan lens 250 is configured to input image light 255 arising from the workpiece 20, wherein the scan lens 250 is configured to transmit the image light as directed by the mirror configuration MC to travel along an imaging optical path OPATH, at least part of which may correspond to an optical axis OA (e.g., of the camera 260 and/or VFL lens 270, etc.). In the example of FIG. 2, the scan lens 250 transmits the image light as directed by the mirror configuration MC along the imaging optical path OPATH that passes through the VFL lens 270 to the camera 260. The camera 260 is configured to receive the image light transmitted along the imaging optical path OPATH and to provide images of the workpiece 20. As will be described in more detail below with respect to FIG. 3B, in various implementations a focus position EFP that corresponds to the focus of the images is configured to be variable within a focus range Refp along the optical axis. In various implementations, the lighting configuration is controlled through a lighting control interface 133 (e.g., including a light controller portion for controlling the lighting configuration, such as light controller portion 133*n*).

As shown in FIG. 2, in various exemplary implementations, the control system portion 120 includes a controller 125 (e.g., comprising or operating as part of one or more processors), the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, the lens control interface 134, and a mirror control interface MCTR'. The lens control interface 134 may include or be connected to a VFL lens controller 180 including circuits and/or routines for controlling various image exposures synchronized with the periodic focus position modulation provided by the VFL (TAG) lens 270. In some implementations, the lens control interface 134 and the VFL lens controller 180 may be merged and/or indistinguishable. In various implementations, the motion control interface 132 may control the movement mechanisms 294XY and 294Z, and/or other movement mechanisms, etc.

As will be described in more detail below, in various implementations the mirror configuration MC (e.g., as controlled over a signal line MCL) may be utilized to adjust to different imaged fields of view as corresponding to different view positions through the scan lens 250. The mirror control interface MCTR' may be utilized (e.g., as controlled by the control system portion 120) to adjust/control movement (e.g., corresponding to rotation, etc.) of one or more mirrors of the mirror configuration MC.

Figure 3A:
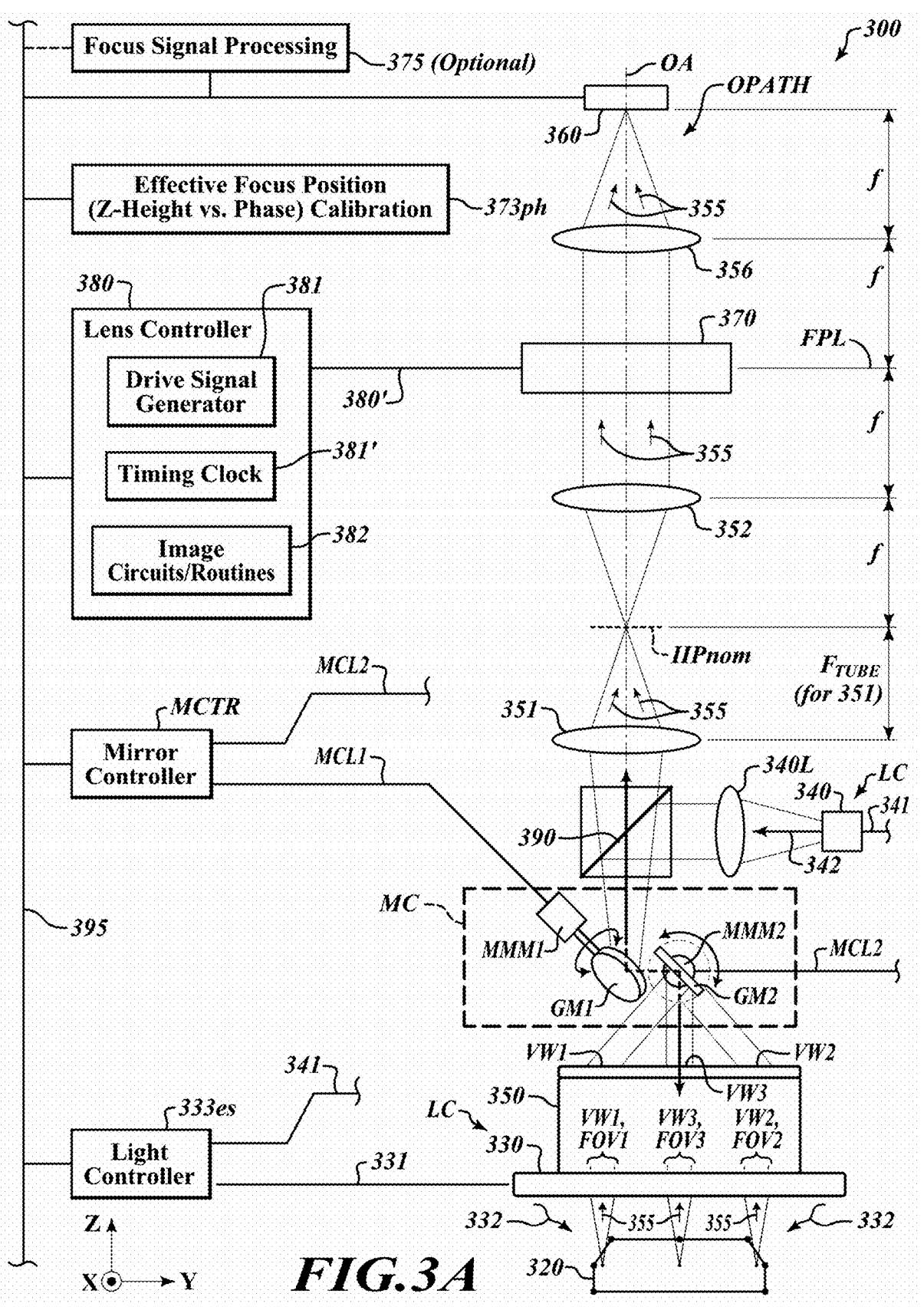
FIGS. 3A-3C are diagrams of an imaging system that may be adapted to a precision non-contact metrology system such as a machine vision metrology system and including certain features as described herein.

The lighting control interface 133 may include lighting control elements 133*a*-133*n* that control, for example, the selection, power, on/off switch, and pulse/strobe timing, if applicable, for the various corresponding light sources of the machine vision metrology system 100. In various implementations, an instance of strobed illumination may be regarded as a type of pulsed illumination, as the terms are utilized herein. In some implementations, a light controller 333*es* as shown in FIG. 3A may provide pulse/strobe timing signals to one or more of the lighting control elements 133*a*-133*n*, such that they provide an image exposure pulse/strobe timing that is synchronized with a desired phase time of the VFL lens focus position modulation (e.g., in accordance with certain stored calibration data), and as described in greater detail below. In some implementations, the light controller 333*es* of FIG. 3A and one or more of the lighting control elements 133*a*-133*n* of FIG. 2 may be merged and/or indistinguishable.

The memory 140 may include an image file memory portion 141, an edge-detection memory portion 140*ed*, a workpiece program memory portion 142 that may include one or more part programs, or the like, and a video tool portion 143. The video tool portion 143 includes video tool portion 143*a* and other video tool portions (e.g., 143*n*) that determine the GUI, image-processing operation, etc., for each of the corresponding video tools, and a region of interest (ROI) generator 143*roi* that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 includes an autofocus video tool 143af that determines the GUI, image-processing operation, etc., for focus height (i.e., effective focus position (Z-coordinate/Z-height)) measurement operations. In various implementations, the autofocus video tool 143af may additionally include a high-speed focus height tool that may be utilized to measure focus heights with high speed using hardware illustrated in FIG. 3A, as described in more detail in U.S. Pat. No. 9,143,674 as incorporated above. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding focus characteristic value (e.g., a quantitative contrast metric value and/or a quantitative focus metric value) for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are useable to perform inspection/measurement operations, and/or to create and/or modify part programs, to view the images captured by the camera system 260, and/or to directly control the vision components portion 200.

In various exemplary implementations, when a user utilizes the machine vision metrology system 100 to create a part program for the workpiece 20, the user generates part program instructions by operating the machine vision metrology system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision metrology system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

In various implementations, the VFL lens controller 180 is configured to control the VFL lens to periodically modulate the optical power of the VFL lens 270 over a range of optical powers at an operating frequency so as to vary the focus position of the system over a plurality of positions within the focus range. In various implementations, the camera 260 may be utilized to acquire an image set comprising a plurality of images of the workpiece 20 (e.g., as described in more detail below), wherein each image of the image set corresponds to different focus position data (e.g., along the optical axis OA, as each corresponding to a different Z-height data in the example of FIG. 2). Focus curve data may be determined based at least in part on an analysis of the image set data corresponding to the images of the image set, wherein the focus curve data indicates three dimensional (3D) positions of a plurality of surface points on the workpiece 20 (e.g., as part of a points-from-focus type process, etc.)

As will be described in more detail below, as part of a process for acquiring sets of images of the workpiece 20 (e.g., as part of a points-from-focus type process), the mirror configuration MC may be utilized to adjust to different imaged fields of view as corresponding to different view positions through the scan lens 250 (e.g., as an alternative to utilizing the movement mechanism 294XY to move the workpiece stage 210 for adjusting to different imaged fields of view). For each imaged field of view, the camera 260 may be utilized to acquire a corresponding image set comprising a corresponding plurality of images of the workpiece 20 in accordance with the corresponding imaged field of view. The VFL lens 270 is controlled to vary the focus position of the metrology system for acquiring the images of each corresponding image set (e.g., wherein each image of the corresponding image set corresponds to different focus position data). In various implementations, for each image of the corresponding image set, the lighting configuration (e.g., as including one or more of the light sources 220, 230 and/or 240) may be controlled to provide at least one instance of pulsed illumination timed to correspond with a respective phase timing of a periodically modulated focus position that corresponds to a respective focus position (e.g., for that respective image of the corresponding image set). In various implementations, for each corresponding image set, corresponding focus position data may be determined based at least in part on an analysis of the images of the corresponding image set, wherein the corresponding focus position data indicates three dimensional positions of a plurality of surface points on the workpiece 20 that are within the corresponding field of view.

Figure 3B:
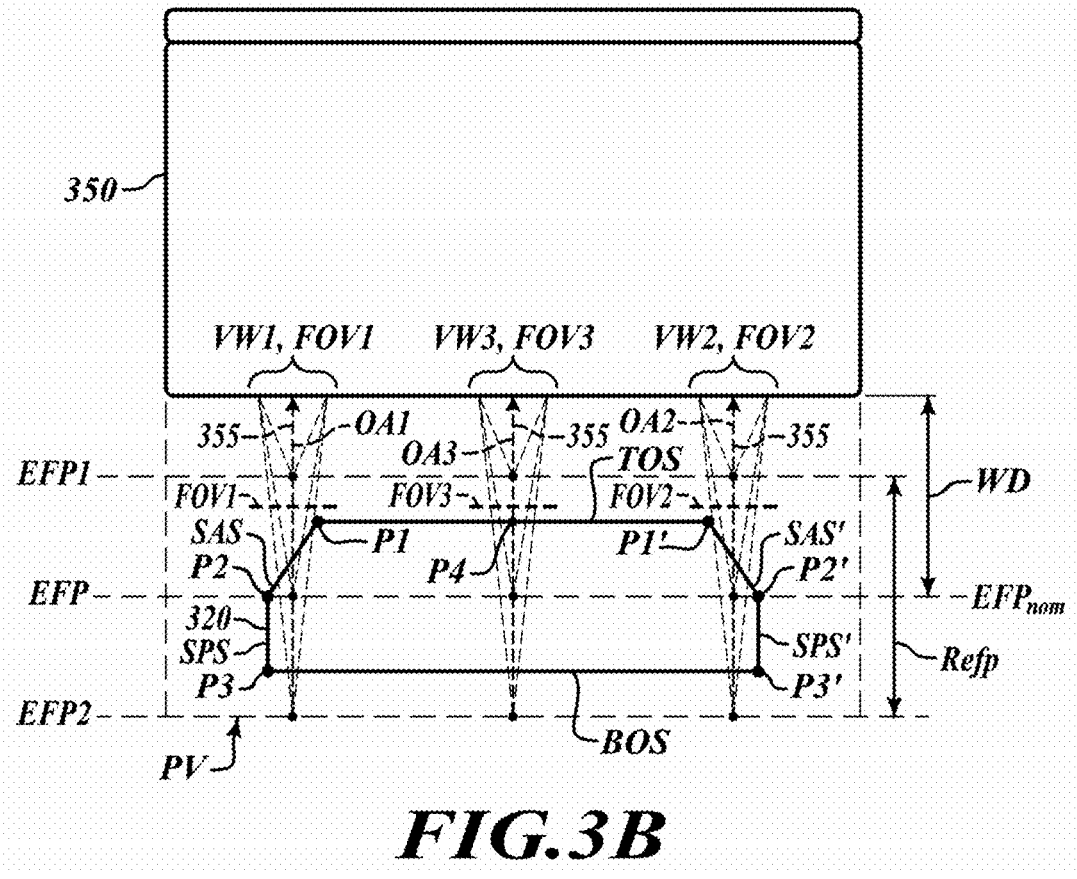
Figure 3C:
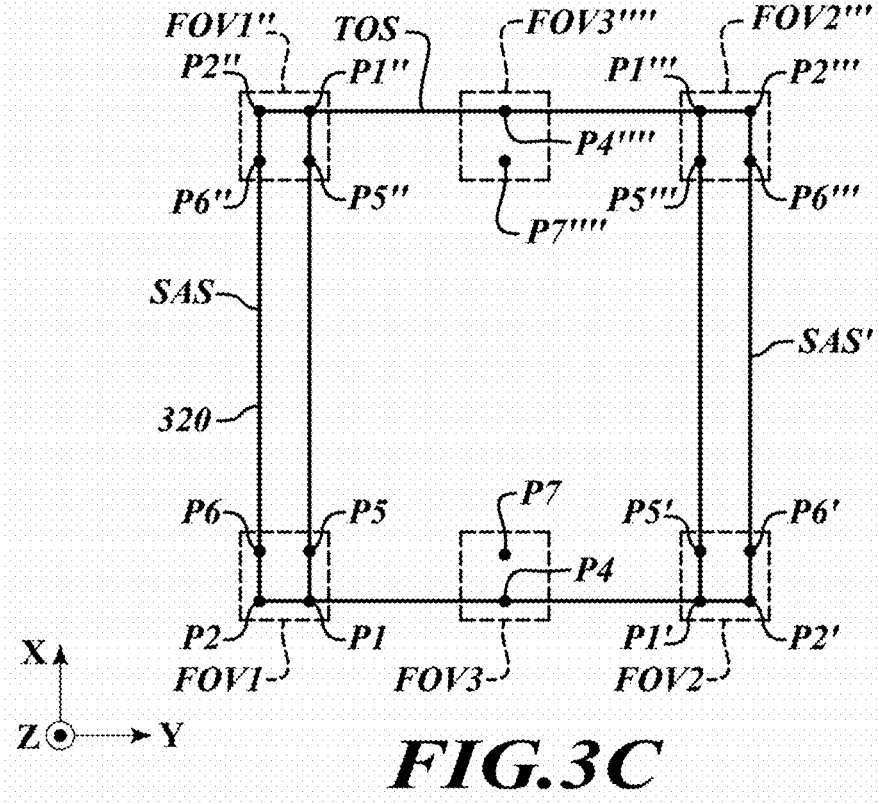

FIGS. 3A-3C are diagrams of an imaging system 300 that may be adapted to and/or otherwise utilized in a precision non-contact metrology system such as the machine vision metrology system of FIGS. 1 and 2. It will be appreciated that certain numbered components 3XX of FIGS. 3A-3C may correspond to and/or provide similar operations or functions as similarly numbered components 2XX of FIG. 2, and may be similarly understood unless otherwise indicated.

As will be described in more detail below, as shown in FIG. 3A an imaging optical path OPATH (also called a workpiece imaging optical path herein) comprises various optical components arranged along a path that conveys image light 355 from the workpiece 320 to the camera 360. The image light is generally conveyed along the direction of their optical axes OA. In the implementation shown in FIGS. 3A-3C, the optical axes OA of certain components are aligned. However, it will be appreciated that this implementation is intended to be exemplary only and not limiting. More generally, the imaging optical path OPATH may include additional mirrors and/or other optical elements, and may take any form that is operational for imaging the workpiece 320 using a camera (e.g., the camera 360) according to known principles. In the illustrated implementation, the imaging optical path OPATH includes the VFL lens 370 and is utilized at least in part for imaging the workpiece 320 during a workpiece image exposure.

As shown in FIG. 3A, the imaging system 300 includes a lighting configuration 330, a light source 340, a light controller 333es, a scan lens 350, a mirror configuration MC, a tube lens 351, a relay lens 352, the VFL (TAG) lens 370, a relay lens 356, a lens controller 380, a camera 360, a mirror controller MCTR, an effective focus position (Z-height vs. phase) calibration portion 373ph, and a workpiece focus signal processing portion 375 (optional). In various implementations, the various components may be interconnected by direct connections or one or more data/control busses (e.g., a system signal and control bus 395) and/or application programming interfaces, etc. In various implementations, a Z-height (e.g., of a surface point on a workpiece) may correspond to and/or alternatively be referenced as a Z-coordinate, and/or a focus position, for which these terms may be utilized interchangeably in certain instances herein.

As will be described in more detail below, in various implementations, the VFL lens controller 380 may control a drive signal of the VFL lens 370 to periodically modulate optical power of the VFL lens 370 over a range of optical powers that occur at respective phase timings within the periodic modulation. The camera 360 (e.g., including an image sensor) receives light transmitted along an imaging optical path OPATH through the VFL lens 370 during an image exposure and provides a corresponding camera image. The scan lens 350 inputs image light arising from a workpiece 320 during an image exposure, and transmits the image light along the imaging optical path OPATH through the VFL lens 370 to the camera 360 during the image exposure, to provide a workpiece image in a corresponding camera image. An effective focus position EFP in front of the scan lens 350 during an image exposure corresponds to the optical power of the VFL lens 370 during that image exposure. The light controller 333es is configured to control an image exposure timing used for a camera image.

With respect to the example implementation shown in FIG. 3A, a lighting configuration LC (e.g., including the lighting configuration 330) may be configured to emit the source light 332 (e.g., with pulsed/strobed illumination) toward a volume PV (e.g., a PFF volume) including at least part of a workpiece 320. As another example, the lighting configuration LC (e.g., including the coaxial light source 340) may emit strobed source light 342 along a path including a lens 340L and a beam splitter 390 (e.g., a partial mirror/reflective surface), for which the mirror configuration MC directs the source light 342 along a path through a view position of the scan lens 350 to a corresponding field of view on the workpiece 320. The source light 332, 342 is reflected as image light 355. The scan lens 350 receives the image light 355 (e.g., workpiece light) that is focused at an effective focus position EFP proximate to the workpiece 320, and outputs the image light 355 to the mirror configuration MC, which directs the light to the tube lens 351. The tube lens 351 receives the image light 355 and outputs it to the relay lens 352. In other implementations, other light sources may illuminate the field of view in a coaxial or non-coaxial manner; for example, light source 220 of FIG. 2.

As will be described in more detail below, a lighting configuration LC is configured to illuminate the workpiece 320 for producing the image light 355. The scan lens 350 is configured to input the image light 355 arising from the workpiece 320, and is configured to transmit the image light 355 along the imaging optical path in OPATH, wherein the scan lens 350 may have an optical axis OA (e.g., as associated with a view position through the scan lens 350). The camera 360 is configured to receive the image light 355 transmitted along the imaging optical path OPATH and to provide images of the workpiece 320, wherein a focus position EFP that corresponds to the focus of the images is configured to be variable within a focus range Refp (e.g., along a direction of an optical axis OA).

The lighting configuration LC (e.g., including the lighting configuration 330 and/or the light source 340) is controlled by a light controller 333es (e.g., as coupled to the lighting configuration 330 and light source 340 by signal lines 331 and 341, respectively) to direct the light 332 and/or 342 toward the volume PV for illuminating the workpiece 320. In various implementations, the lens controller 380 is configured to control the VFL lens to periodically modulate the optical power of the VFL lens 370 over a range of optical powers at an operating frequency so as to vary the focus position of the system over a plurality of positions within the focus range Refp (e.g., as illustrated in FIG. 3B). The camera 360 is utilized to acquire an image set comprising a plurality of images of the workpiece 320 (e.g., as described in more detail below with respect to FIGS. 4 and 5), wherein each image of the image set corresponds to different focus position data (e.g., as each corresponding to different Z-height data). Focus curve data may be determined based at least in part on an analysis of the images of the image set, wherein the focus curve data indicates three dimensional positions of a plurality of surface points on the workpiece 320 (e.g., as part of a points-from-focus type process).

In the example of FIG. 3B, an enlarged illustration of the workpiece 320 includes a top orthogonal surface TOS, a bottom orthogonal surface BOS, side angled surfaces SAS and SAS', and side parallel surfaces SPS and SPS', for which each of the orthogonal, angled and parallel references are in relationship to an optical axis direction (e.g., as corresponding to a Z-axis direction). On a left side of the workpiece 320, a surface point P1 corresponds to a corner between the top orthogonal surface TOS and the side angled surface SAS, while a surface point P2 corresponds to a corner between the side angled surface SAS and the side parallel surface SPS, and a surface point P3 corresponds to a corner between the side parallel surface SPS and the bottom orthogonal surface BOS. On a right side of the workpiece 320, a surface point P1' corresponds to a corner between the top orthogonal surface TOS and the side angled surface SAS', while a surface point P2' corresponds to a corner between the side angled surface SAS' and the side parallel surface SPS', and a surface point P3' corresponds to a corner between the side parallel surface SPS' and the bottom orthogonal surface BOS. At a center of the workpiece 320, a surface point P4 is on the top orthogonal surface TOS and is centered between the surface points P1 and P1'.

It will be appreciated that the light provided by the lighting configuration LC as directed toward the workpiece 320 may illuminate each of the top orthogonal surface TOS, the side angled surfaces SAS and SAS', and the side parallel surfaces SPS and SPS', so as to enable imaging of each surface (i.e., as enabling corresponding determinations of three dimensional positions of surface points on each of the imaged surfaces, such as for surface points P1, P2, P3, P1', P2', P3', P4, etc.). As will be described in more detail below, as part of a points-from-focus type process, image sets may be acquired comprising a plurality of images of the workpiece 320, from which focus curve data may be determined (e.g., based at least in part on an analysis of the images of the image set), wherein the focus curve data indicates three dimensional positions of surface points (e.g., three dimensional positions of surface points P1, P2, P3, P1', P2', P3', P4) on the workpiece 320. In various implementations, the determination of three dimensional positions (e.g., including three dimensional coordinates) of surface points such as surface points P1, P2, P3, P1', P2', P3' and P4 may be utilized to determine three dimensional shapes (e.g., of various features of the workpiece 320).

In the implementation shown in FIG. 3A, image light 355 arising from a nominal focal plane of the scan lens 350 is directed by the mirror configuration MC to the tube lens 351, and is focused by the tube lens 351 to form an intermediate image at a nominal intermediate image plane IIPnom. In various implementations, the tube lens 351 may be included as part of a turret lens assembly (e.g., similar to the turret lens assembly 223 of FIG. 2). When the VFL lens 370 is in a state where it provides no lensing effect (no optical power), the nominal focal plane of the scan lens 350, the nominal intermediate image plane IIPnom, and the image plane of the camera 360 form a set of conjugate planes, according to known microscope imaging principles. In various implementations, any of the other lenses referenced herein may be formed from or operate in conjunction with individual lenses, compound lenses, etc.

The relay lens 352 receives the image light 355 from the tube lens 351 (or more generally from an intermediate image plane, in various alternative microscope configurations) and outputs it to the VFL lens 370. The VFL lens 370 receives the image light 355 and outputs it to the relay lens 356. The relay lens 356 receives the image light 355 and outputs it to the camera 360. In various implementations, the camera 360 captures a camera image during an image exposure (e.g., during an integration period of the camera 360) also referred to as an image exposure period, and may provide the corresponding image data to a control system portion. Some camera images may include a workpiece image (e.g., of a region of the workpiece 320) provided during a workpiece image exposure. In some implementations, an image exposure (e.g., a workpiece image exposure) may be limited or controlled by a strobe timing of the lighting configuration 330 that falls within an image integration period of the camera 360. In various implementations, the camera 360 may have a pixel array greater than 1 megapixel (e.g., 1.3 megapixel, with a 1280×1024 pixel array, with 5.3 microns per pixel).

In the example of FIG. 3A, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the scan lens 350 are designated as being included in a microscope configuration. All of the illustrated configurations will be understood to be exemplary only, and not limiting with respect to the present disclosure. As part of the Keplerian telescope configuration, a focal distance FTUBE of the tube lens 351 is illustrated as being approximately equidistant to a midpoint between the lenses 351 and 352, as is a focal distance f of the relay lens 352. In alternative implementations, the focal distance FTUBE for the tube lens 351 may be made to be different than the focal distance f of the relay lens 352 (which corresponds to one of the 4 f's of the 4f optical configuration).

In various implementations, the illustrated 4f optical configuration permits placing the VFL (TAG) lens 370 (e.g., which may be a low numerical aperture (NA) device) at the Fourier plane FPL of the scan lens 350. This configuration may maintain the telecentricity at the workpiece 320, and may minimize scale change and image distortion (e.g., including providing constant magnification for each effective focus position (Z-height) of the workpiece 320). The Keplerian telescope configuration (e.g., including the tube lens 351 and the relay lens 352) may be included between the microscope configuration and the 4f optical configuration, and may be configured to provide a desired size of the projection of the scan lens clear aperture at the location of the VFL (TAG) lens 370, so as to minimize image aberrations, etc.

In various implementations, another 4f imaging configuration (e.g., for a total of an 8f imaging configuration) may correspond to the configuration/arrangement of the lens 351 in combination with the scan lens 350. In various implementations, the overall system magnification SM (of the 8f configuration) may correspond to $SM=(f_{351}/f_{350})(f_{356}/f_{352})$, where $f_{351}$ corresponds to the focal length of the lens 351, $f_{350}$ corresponds to the focal length of the scan lens 350, $f_{356}$ corresponds to the focal length of the lens 356, and $f_{352}$ corresponds to the focal length of the lens 352.

In various implementations, the scan lens 350 may be an F-theta scan lens. In various configurations, an F-theta scan lens is a lens assembly that allows for a flat image plane and high resolution. Such lenses are also sometime referenced as plane field objective lenses or flat field objective lenses. In various implementations, such lenses may be made up of three or four lenses that are pre-aligned and mounted in a sturdy housing. In configurations such as those described herein, an F-theta scan lens helps avoid magnification changes in relation to the different imaged fields of view as corresponding to the different view positions through the scan lens 350. In various implementations, the scan lens 350 may also be a telecentric scan lens. Utilization of a telecentric scan lens may help ensure that different parts of the workpiece 320 are being viewed at nearly normal incidence (e.g., for PFF type processes such as corresponding to height measurements/determinations for surface points on the workpiece, etc.).

In various implementations, the lens controller 380 may include a drive signal generator portion 381, a timing clock 381', and imaging circuits/routines 382. The drive signal generator portion 381 may operate (e.g., in conjunction with the timing clock 381') to provide a periodic drive signal to the high speed VFL (TAG) lens 370 via a signal line 380' (e.g., for providing and/or adjusting an amplitude driving signal, as will be described in more detail below). In various implementations, the imaging system 300 (which may also be referenced as a VFL lens system) may comprise a control system (e.g., the control system portion 120 of FIG. 2) that is configurable to operate in conjunction with the lens controller 380 for coordinated operations.

In various implementations, the lens controller 380 may generally perform various functions related to imaging a workpiece 320 in a manner synchronized with a desired phase timing of the VFL lens 370, as well as controlling, monitoring and adjusting the driving and response of the VFL lens 370. In various implementations, the image circuits/routines 382 perform standard imaging operations for the optical system, synchronized with the phase timings of the VFL lens 370.

With respect to the general operations of the VFL lens 370, in various implementations as described herein, the lens controller 380 may rapidly adjust or modulate the optical power of the VFL lens 370 periodically, to achieve a high-speed VFL lens that periodically modulates its optical power at a VFL lens resonant frequency of 400 kHz, 250 kHz, 70 kHz, or 30 kHz, etc. As shown in FIG. 3B (e.g., which illustrates general operations in relation to the scan lens 350, and also in relation to each of the illustrated example view positions VW1, VW2 and VW3 through the scan lens 350), by using the periodic modulation of a signal to drive the VFL lens 370, the effective focus position EFP of the imaging system 300 of the metrology system (that is, the focus position in front of the scan lens 350) may be rapidly moved within a range Refp (e.g., a focus range or an autofocus search range, etc.) bound by an effective focus position EFP1 (or EFP max or peak focus distance Z1 max+) corresponding to a maximum optical power of the VFL lens 370 in combination with the scan lens 350, and an effective focus position EFP2 (or EFP min or peak focus distance Z1 max−) corresponding to a maximum negative optical power of the VFL lens 370 in combination with the scan lens 350. In various implementations, the effective focus positions EFP1 and EFP2 may approximately correspond to phase timings of 90 degrees and 270 degrees. For purposes of discussion, the middle of the range Refp may be designated as EFPnom, and may approximately correspond to zero optical power of the VFL lens 370 in combination with the nominal optical power of the scan lens 350. According to this description, EFPnom may approximately correspond to the nominal focal length of the scan lens 350 in some implementations (e.g., which may correspond to a working distance WD of the scan lens 350).

In some implementations, the optional focus signal processing portion 375 may input data from the camera 360 and may provide data or signals that are utilized to determine when an imaged surface region (e.g., including one or more surface points of a workpiece 320) is at an effective focus position. For example, a group of images acquired by the camera 360 at different effective focus positions (Z-heights), such as part of an image set, may be analyzed using a known "maximum contrast" or "best focus image" analysis to determine when a region of interest of an imaged surface region of a workpiece 320 is at a corresponding effective focus position (Z-height). However, more generally, any other suitable known image focus detection configuration may be used. In any case, the workpiece focus signal processing portion 375 or the like may input an image or images acquired during the periodic modulation of the effective focus position (during the sweeping of multiple effective focus positions) of the VFL lens 370, and determine an image and/or image timing at which a target feature (e.g., including one or more surface points of a workpiece) is best focused.

In some implementations, the focus signal processing portion 375 may determine a phase timing corresponding to a best focus (e.g., of a workpiece feature) and output that "best focus" phase timing value to an effective focus position calibration portion 373*ph*. The effective focus position (Z-height vs. phase) calibration portion 373*ph* may store "phase" calibration data determined by calibration processes such as those disclosed in the incorporated references. The effective focus position calibration portion 373*ph* may provide effective focus position (Z-height vs. phase) calibration data that relates respective effective focus positions (Z-heights) to respective "best focus" phase timings within a period of a resonant frequency of the VFL lens 370. In various implementations, the associated recorded effective focus position (Z-height) calibration data 373*ph* may be merged with and/or indistinguishable from the lens controller 380, the workpiece focus signal processing portion 375, or a host computer system connected to the system signal and control bus 395, etc.

In various implementations, the light controller 333*es* controls an image exposure time of the imaging system 300 (e.g., relative to a phase timing of the periodically modulated effective focus position). More specifically, during an image exposure, the light controller 333*es* may use the effective focus position (Z-height) calibration data available in the effective focus position (Z-height vs. phase) calibration portion 373*ph* and control the lighting configuration LC (e.g., as including the lighting configuration 330 and/or the light source 340) to pulse/strobe at a respective time. For example, the light controller 333*es* may control the lighting configuration LC to pulse/strobe at a respective phase timing within a period of a standard imaging resonant frequency of the VFL lens 370, so as to acquire an image having a particular effective focus position within the sweeping (periodic modulation) range of the VFL lens 370. It will be appreciated that the operations of the light controller 333*es* and other features and elements outlined above may be implemented to govern workpiece image acquisitions.

As illustrated in FIG. 3A, the mirror configuration MC includes mirrors GM1 and GM2, and corresponding mirror movement mechanisms MMM1 and MMM2. In various implementations, the mirror configuration MC may be, or may be comparable to, a high speed galvo mirror configuration, or other type of steering mirror configuration (e.g., for which the mirrors GM1 and GM2 may in some instances be characterized as steering mirrors). In the illustration of FIG. 3A, the first mirror GM1 receives image light 355 from the scan lens 350, and directs/reflects the image light 355 to the second mirror GM2, which directs/reflects the image light 355 upward towards the beamsplitter 380 and lens 351 (i.e., along the imaging optical path OPATH). Adjustments in the orientations of the first and second mirrors GM1 and GM2 correspondingly adjust a view position through the scan lens 350, as will be described in more detail below.

The first mirror GM1 is configured to be adjusted by rotating the first mirror GM1 (e.g., as rotated by the first mirror movement mechanism MMM1) to adjust the view position through the scan lens 350 in a first adjustment direction (e.g., along the X-axis direction, such as for adjusting from the view position corresponding to the field of view FOV1 to the view position corresponding to the field of view FOV1″ in FIG. 3C). The second mirror GM2 is configured to be adjusted by rotating the second mirror GM2 (e.g., as rotated by the second mirror movement mechanism MMM2) to adjust the view position through the scan lens 350 in a second adjustment direction (e.g., along the Y-axis direction, such as for adjusting from the view position VW1 corresponding to the field of view FOV1 to the view position VW2 corresponding to the field of view FOV2 in FIGS. 3A-3C, or to the view position VW3 corresponding to the field of view FOV3 in FIGS. 3A-3C). In various implementations, the first and second adjustment directions may be orthogonal to each other and/or to an optical axis direction (e.g., of the scan lens 350 and/or other optical components along the path OPATH, such as the lens 351 and/or the camera 360, etc.) A mirror controller MCTR may be utilized to control the mirror movement mechanisms MMM1 and MMM2 (e.g., such as by providing control signals over signal lines MCL1 and MCL2, respectively).

FIG. 3C is a top view illustrating fields of view FOV1, FOV2, FOV3, FOV1″, FOV2‴ and FOV3″″ in relation to the workpiece 320. In various implementations, the surface points P3 and P3′ (e.g., which may be beneath the surface points P2 and P2′, respectively) may generally not be visible in the example top view of FIG. 3C. The field of view FOV1 (i.e., as corresponding to the view position VW1 through the scan lens 350) is shown to include surface points P1, P2, P5 and P6 (e.g., for which the surface points P5 and P6 may have similar Z-heights as the surface points P1 and P2, respectively). The field of view FOV2 (i.e., as corresponding to the view position VW2 through the scan lens 350) is shown to include surface points P1′, P2′, P5′ and P6′ (e.g., for which the surface points P5′ and P6′ may have similar Z-heights as the surface points P1′ and P2′, respectively). The field of view FOV3 (i.e., as corresponding to the view position VW3 through the scan lens 350) is shown to include surface points P4 and P7 (e.g., for which the surface point P7 may have a similar Z-height as the surface point P4).

The fields of view FOV1″, FOV2‴ and FOV3″″ may have characteristics that may be described as being mirror images of the fields of view FOV1, FOV2 and FOV3, respectively, that are on the opposite side of the workpiece. More specifically, the field of view FOV1″ includes surface points P1″, P2″, P5″ and P6″ (e.g., which in some implementations may be characterized as being a mirror image of the field of view FOV1 on the opposite side of the workpiece), and with the surface points P1″, P2″, P5″ and P6″ having a similar Z-heights as the respective surface points P1, P2, P5 and P6 (e.g., with the surface point P1″ having a similar Z-height as the surface point P1, and the surface point P2″ having a similar Z-height as the surface point P2, etc.) Similarly, the field of view FOV2‴ includes surface points P1‴, P2‴, P5‴ and P6‴, which may have similar Z-heights as the respective surface points P1′, P2′, P5′ and P6′ of the field of view FOV2. The field of view FOV3″″ includes surface points P4″″ and P7″″, which may have similar Z-heights as the respective surface points P4 and P7 of the field of view FOV3.

One example process for acquiring certain sets of images of the workpiece 320 may be described as follows. As noted above, the lighting configuration LC may be controlled to provide light for illuminating the workpiece 320. The mirror configuration MC may be utilized to adjust to a first imaged field of view FOV1 as corresponding to a first view position VW1 through the scan lens 350. The camera 360 may be utilized to acquire a first image set comprising a first plurality of images of the workpiece 320 in accordance with the first imaged field of view FOV1 as corresponding to the first view position VW1 through the scan lens 350. The VFL lens 370 is controlled to vary the focus position EFP of the metrology system for acquiring the images of the first image set (e.g., wherein each image of the first image set corresponds to different focus position data). In various implementations, for each image of the first image set, the lighting configuration LC may be controlled to provide at least one instance of pulsed illumination timed to correspond with a respective phase timing of a periodically modulated focus position that corresponds to a respective focus position (e.g., for that respective image of the first image set). In various implementations, first focus position data may be determined based at least in part on an analysis of the images of the first image set, wherein the first focus position data indicates three dimensional positions of a plurality of surface points (e.g., including surface points P1, P2, P5, P6) on the workpiece 320 that are within the first imaged field of view FOV1.

The mirror configuration MC may then be utilized to adjust to a second imaged field of view FOV2 as corresponding to a second view position VW2 through the scan lens 350. As illustrated in the example of FIG. 3C, the first and second fields of view FOV1 and FOV2 do not overlap. The camera 360 may be utilized to acquire a second image set comprising a second plurality of images of the workpiece 320 in accordance with the second imaged field of view FOV2 as corresponding to the second view position VW2 through the scan lens 350. The VFL lens 370 is controlled to vary the focus position EFP of the metrology system for acquiring the images of the second image set (e.g., wherein each image of the second image set corresponds to different focus position data). In various implementations, for each image of the second image set, the lighting configuration LC may be controlled to provide at least one instance of pulsed illumination timed to correspond with a respective phase timing of a periodically modulated focus position that corresponds to a respective focus position (e.g., for that respective image of the second image set). In various implementations, second focus position data may be determined based at least in part on an analysis of the images of the second image set, wherein the second focus position data indicates three dimensional positions of a plurality of surface points (e.g., including surface points P1′, P2′, P5′, P6′) on the workpiece 320 that are within the second imaged field of view FOV2.

As the process continues, the mirror configuration MC may be utilized to adjust to a plurality of additional imaged fields of view (e.g., fields of view FOV3, FOV1″, FOV2‴, FOV3″″) as corresponding to a plurality of additional view positions through the scan lens 350. For each additional imaged field of view, the camera 360 may be utilized to acquire a corresponding image set comprising a corresponding plurality of images of the workpiece 320 in accordance with the corresponding imaged field of view. The VFL lens 370 is controlled to vary the focus position EFP of the metrology system for acquiring the images of each corresponding image set (e.g., wherein each image of the corresponding image set corresponds to different focus position data). In various implementations, for each image of the corresponding image set, the lighting configuration LC may be controlled to provide at least one instance of pulsed illumination timed to correspond with a respective phase timing of a periodically modulated focus position that corresponds to a respective focus position (e.g., for that respective image of the corresponding image set). In various implementations, for each corresponding image set, corresponding focus position data may be determined based at least in part on an analysis of the images of the corresponding image set, wherein the corresponding focus position data indicates three dimensional positions of a plurality of surface points on the workpiece 320 that are within the corresponding field of view.

As noted above, in certain implementations, the desired highest accuracy measurements may primarily be within each of the imaged fields of view (e.g., such as for distance measurements and/or relative height measurements between certain surface points as may correspond to certain features within a field of view). As some specific examples in relation to the illustration of FIG. 3C, such desired highest accuracy measurements may correspond to determining the relative relationships between certain different pairs or groups of the surface points in each of the fields of view (e.g., determining the relative three dimensional coordinates and/or corresponding distances of the surface points P1 and P2 relative to each other, and/or of the surface points P5 and P6 relative to each other, etc.) Similar determinations may be made for surface points within each of the fields of view FOV2", FOV1", FOV2"', etc. As noted above, in such instances, the mirror configuration MC may be utilized with the scan lens to rapidly adjust to the desired fields of view, and for which mechanical movement of a workpiece stage across such distances is not required. It will be appreciated that in various implementations higher relative throughput may be achieved as corresponding to more rapid measurements of workpieces (e.g., wherein the mirror configuration MC may be utilized with the scan lens to rapidly adjust to all desired fields of view, and the VFL lens may be utilized to rapidly obtain the images for the points-from-focus type process for the measurements of the workpiece, etc.).

In various implementations, the different focus positions may be along an optical axis direction (e.g., of the scan lens 350 and/or other optical components along the imaging optical path OPATH, such as the lens 351 and/or the camera 360, etc.) and/or may be along the Z-axis direction of the system. In various implementations, there may be a central optical axis of the scan lens 350, and in some instances optical axes may be referenced for each of the view positions. For example, in FIG. 3B each of the view positions VW1, VW2 and VW3 is illustrated as having a corresponding optical axis OA1, OA2 and OA3, respectively. Regardless of such possible designations, it will be appreciated that an optical axis direction of the scan lens 350 (e.g., as may be parallel to the Z-axis) is the same in all instances, and that the scan lens 350 is along the imaging optical path OPATH, along with the mirror configuration MC, the beamsplitter 390, etc.

In various implementations, the lighting configuration LC (e.g., as including the lighting configuration 330 and/or the light source 340) may provide illumination with a narrow bandwidth. In some configurations, one benefit of narrow band illumination may be a reduction in lateral color aberration that may sometimes otherwise occur in the scan lens 350. As a specific numerical example, in one implementation the scan lens 350 may be optimized for utilization with illumination with a wavelength of 532 nm.

Figure 4:
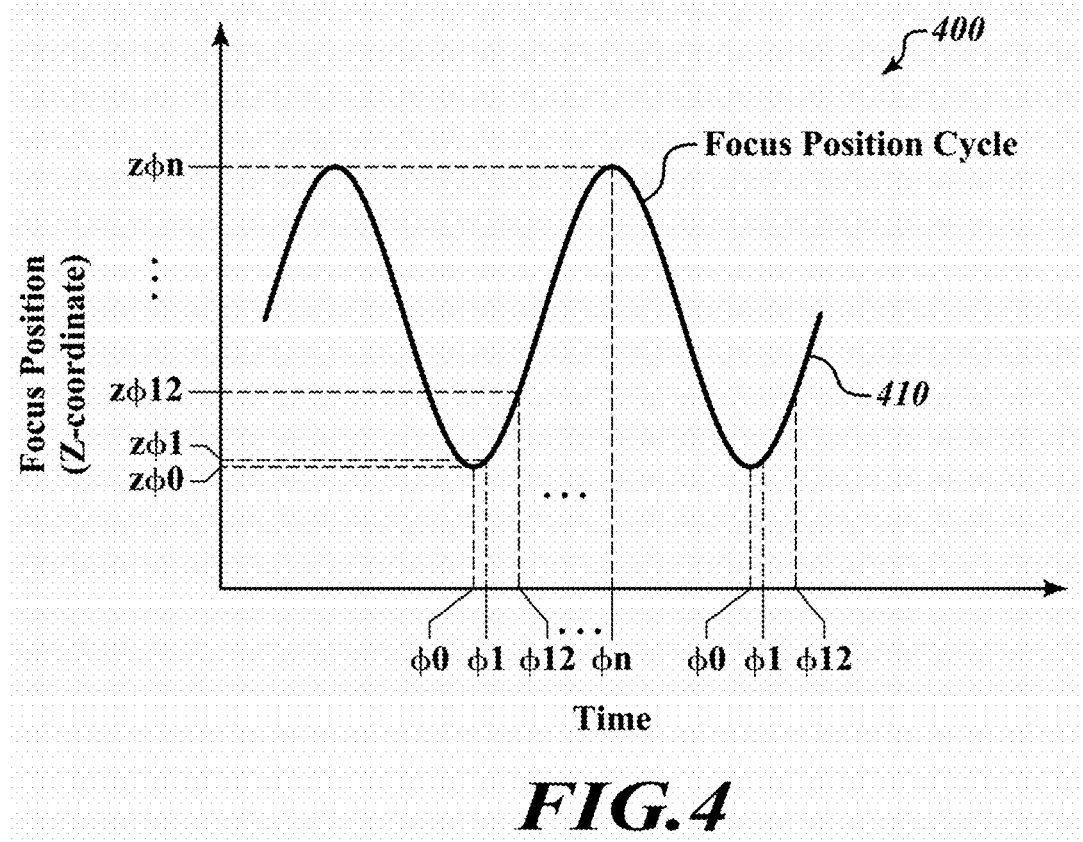
FIG. 4 is a chart of a timing diagram showing a periodically modulated focus position of a system such as that of FIGS. 1-3, and also qualitatively showing how pulsed/strobed illumination can be timed to correspond with a respective phase timing of the periodically modulated focus position to expose an image focused at a respective focus position/Z-coordinate.

FIG. 4 is a chart of a timing diagram showing a periodically modulated focus position of a system such as that of FIGS. 1-3C, and also qualitatively showing how pulsed/strobed illumination can be timed to correspond with a respective phase timing of the periodically modulated focus position to expose an image focused at a respective Z-coordinate. In the illustrated example, each focus position has a corresponding Z-coordinate, for which an optical axis OA (e.g., of the scan lens 350) may define and/or otherwise be aligned (e.g., be coaxial or in parallel with, etc.) a Z-axis of a corresponding coordinate system (e.g., for which the Z-coordinates may alternatively be referenced as Z-axis coordinates and/or Z-heights). The periodically modulated focus position is represented by a sinusoidal curve 410. The relationship of the focus position (i.e., as indicated by corresponding Z-coordinates) to the phase timing may be established by calibration according to known principles (e.g., by repeatedly stepping a surface to a known Z-coordinate, and then manually or computationally determining the phase timing that best focuses an image at the known Z-coordinate, and storing that relationship in a lookup table or the like).

The diagram 400 also qualitatively shows how pulsed/strobed illumination can be timed to correspond with a respective phase timing (e.g., $\phi 0$, $\phi 1$, $\phi 12$, $\phi n$, etc.) of the periodically modulated focus position to expose an image focused at a respective Z-coordinate (e.g., $z\phi 0$, $z\phi 1$, $z\phi 12$, $z\phi n$, etc.) That is, in the illustrated example, while the camera 360 is acquiring an image during an integration period, if a pulse of illumination is short relative to the period of the focus modulation and is provided at the phase timing $\phi 0$, then the focus position will be at the Z-coordinate $z\phi 0$, and any workpiece surface/surface point that is located at the Z-coordinate $z\phi 0$ will be in focus in the resulting image. A similar description applies for the other exemplary phase timings and Z-coordinates shown in the diagram 400.

It will be understood that the phase timings shown in the diagram 400 are exemplary only and not limiting. More generally, any phase timing selected by a user or automatically selected by a control system will have an associated focus position within the range of Z-coordinates $z\phi 0$-$z\phi n$, which represent the minimum and maximum Z-coordinates of the periodically modulated focus position. It will also be understood that if one strobe pulse at a particular phase timing is not sufficient to provide a well exposed image, the strobe pulse may be repeated at that particular phase timing for any desired number of periods within the image integration period (as schematically illustrated by the repeated instances of any of the exemplary phase timings $\phi 0$, $\phi 1$, $\phi 12$ in the diagram 400). For example, one, or several, or thousands, etc., of such pulses may be integrated in an integration period, in some implementations. The effect will be to increase the image exposure corresponding to that particular phase timing and/or Z-coordinate in the resulting image. As one specific example implementation, for a variable focal length lens that modulates at a frequency of 72 kHz and an imaging array in a camera operating at 30 frames per second, a single camera frame acquisition time may correspond to 2,400 cycles of the variable focal length lens and the resulting focus position Z-coordinate. It will be appreciated that the exemplary phase timings $\phi 1$ and $\phi 12$ are shown on a rising slope of the focus position cycle. In some embodiments, pulses may also be integrated in an integration period which corresponds to the same Z-coordinates during a falling slope of the focus position cycle.

Figure 5:
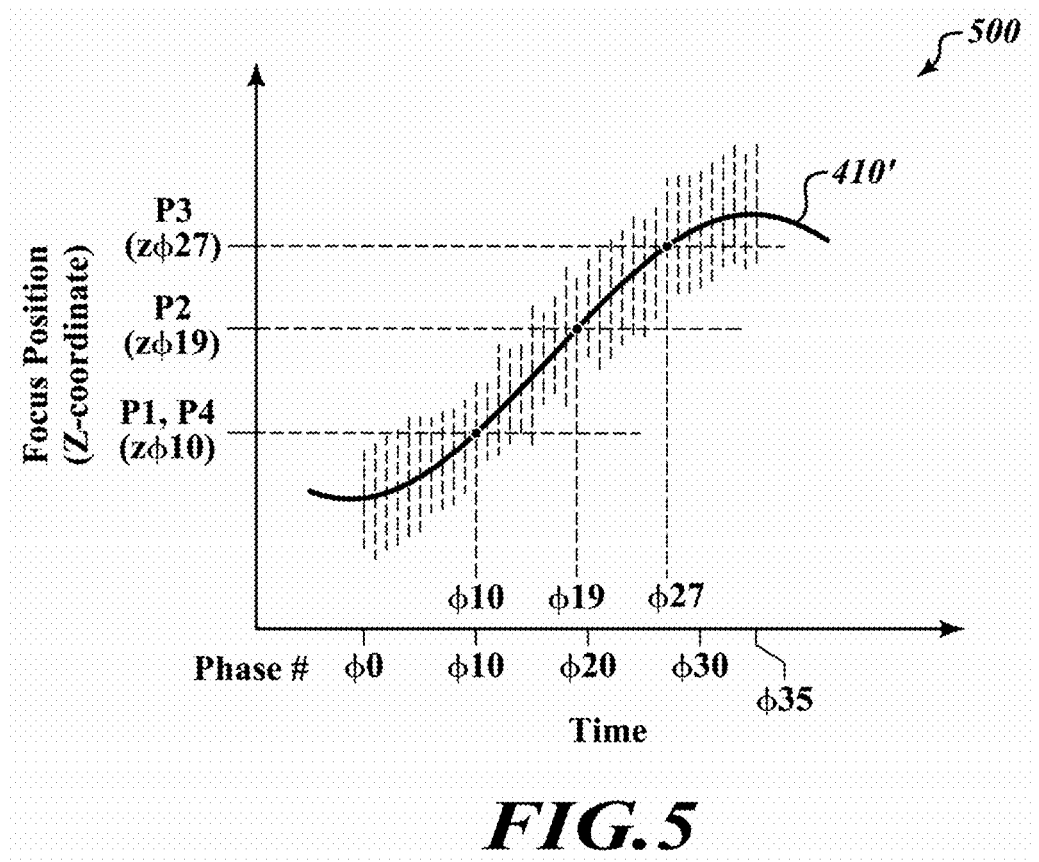
FIG. 5 is a chart showing an expanded portion of the periodically modulated focus position shown in FIG. 4, phase timings corresponding to those usable to collect an image set, and also qualitatively showing how instances of pulsed/strobed illumination that correspond with phase timings of the periodically modulated focus position can be utilized to produce corresponding exposure images that provide image focus for surface points/workpiece features that are located at different focus positions/Z-coordinates.

FIG. 5 is a chart 500 showing a horizontally expanded portion 410' of the sinusoidal curve 410 of the periodically modulated focus position shown in FIG. 4, and phase timings corresponding to those usable to collect an image set (e.g., represented by the phase timing positions of the vertical dashed lines in the chart 500). FIG. 5 also qualitatively shows how first, second and third particular instances of pulsed illumination that correspond with first, second and third phase timings (e.g., in this particular example exemplary phase timings $\phi 10$, $\phi 19$ and $\phi 27$) of the periodically modulated focus position can be utilized to produce corresponding exposure images that provide image focus for workpiece features/surface points that are located at different Z-coordinates. Examples may include a first surface point P1 located at a first Z-coordinate $Z\phi 10$, a second surface point P2 located at a second Z-coordinate $Z\phi 19$, a third surface point P3 located at a third Z-coordinate $Z\phi 27$, and a fourth surface point P4 located at the first Z-coordinate $Z\phi 10$, such as may correspond to the surface points P1, P2, P3 and P4 of the example of FIGS. 3B and 3C (e.g., and for which phase timings corresponding to the Z-coordinates of the other surface points P5, P6, etc. may similarly be understood).

Regarding the phase timings corresponding to those usable to collect an image set (represented by the phase timing positions of the vertical dashed lines in the chart

500), in accordance with principles disclosed herein, in one implementation an image set (or multiple image sets) may be acquired with respect to a field of view (e.g., including one or more regions of interest) of a representative workpiece. For example, an image set may be acquired by exposing a first image using one or more strobe illumination pulses (e.g., over one or more periods) coinciding with the phase timing ϕ0. A second image in the image set may be similarly acquired using the phase timing ϕ1, and so on up to phase timing ϕ35 in the illustrated example. It will be understood that an image set images a field of view using various focus positions, and generally can include any desired number of images with focus positions corresponding to desired Z-coordinates, acquired using corresponding phase timings.

As noted above, FIG. 5 illustrates in part how first, second and third particular instances of strobed illumination that correspond with first, second and third phase timings (e.g., the exemplary phase timings ϕ10, ϕ19 and ϕ27) of the periodically modulated focus position can be utilized to produce corresponding exposure images that provide image focus for surface points that are located at different Z-coordinates (e.g., such as first and fourth surface points P1 and P4 located at a first Z-coordinate Zϕ10, a second surface point P2 located at a second Z-coordinate Zϕ19, and a third surface point P3 located at a third Z-coordinate Zϕ27).

As illustrated in FIG. 5, the first, second, and third and fourth surface points on a representative workpiece (e.g., workpiece 320) are indicated as having a sufficient image focus in respective images. The first and fourth surface points P1 and P4 are indicated as being best or sufficiently focused at a Z-coordinate Zϕ10 which corresponds to a phase timing of ϕ10, and the second surface point P2 is indicated as being best or sufficiently focused at a Z-coordinate Zϕ19 which corresponds to a phase timing of ϕ19, and a third surface point P3 is indicated as being best or sufficiently focused at a Z-coordinate Zϕ27 which corresponds to a phase timing of ϕ27. In various implementations, the contrast in one or more regions of interest may be analyzed (e.g., according to known methods) in each image of an image set. Utilizing such processes, the particular images and/or interpolated Z-coordinates indicated as providing the best or sufficient contrast and focus for the first, second, third and fourth surface points P1, P2, P3 and P4, respectively, may be determined.

In various implementations, a determination of an image which has the best or sufficient image focus for a workpiece feature in a region of interest may be made according to various techniques. In one specific example implementation, a technique including an analysis of a focus curve may be utilized. A focus curve may be formed based on focus curve data points, which may be established according to known methods (e.g., as described in incorporated references). Briefly, in one exemplary method, for each captured image in the image set, a focus metric value is calculated based on the respective region of interest in that image, and that focus metric value becomes a data point on the focus curve (e.g., related to the corresponding phase timing and Z-coordinate at which the image was captured). This results in focus curve data, which may be referred to simply as a "focus curve" or "autofocus curve." Exemplary techniques for the determination and analysis of image sets and focus curves are taught in U.S. Pat. Nos. 8,581,162; 9,060,117 and 10,880,468, each of which is hereby incorporated herein by reference in its entirety.

In some implementations, the processing including the obtaining of the image set may be referenced as a pointsfrom-focus (PFF) type process, as utilized to determine Z-coordinates of points on the workpiece surface. The PFF image set may be processed to determine or output a Z-coordinate map (e.g. a point cloud) that quantitatively indicates a set of three dimensional surface coordinates (e.g., corresponding to a surface shape or profile of the workpiece). In such a PFF type analysis, in some implementations each focus curve may correspond to a single point or X, Y location on the workpiece surface. That is, the peak of each focus curve may indicate the Z-coordinate of the single point along the direction of the optical axis OA of the system. In various implementations, the PFF type analysis repeats this process for multiple surface points (e.g., each with a corresponding region of interest) across the workpiece surface such that a profile of at least part of the workpiece surface can be determined. In general, the process may be performed for multiple surface points that are within a field of view (i.e., as captured within the images of the image set), where for each image of the image set, a particular ROI(i) may correspond to an X, Y location (e.g., as may correspond to a particular point) on the workpiece surface (e.g., with the point at the center of the ROI).

As indicated above, in various implementations, the analysis of an image set includes determining focus curve data for the image set which indicates a focus position at which a surface point is in focus (e.g., as may correspond to a local peak or other characteristic of the focus curve). For example, the focus curve data may indicate a first focus position (e.g., corresponding to a Z-coordinate Zϕ10, which may also be referenced as Z1) at which the first surface point P1 is in focus (e.g., and at which the fourth surface point P4 is in focus), a second focus position (e.g., corresponding to a Z-coordinate Zϕ19, which may also be referenced as Z2) at which the second surface point P2 is in focus, and a third focus position (e.g., corresponding to a Z-coordinate Zϕ27, which may also be referenced as Z3) at which the third surface point P3 is in focus.

In addition to the determinations/indications of the Z-coordinates of each of the surface points, the focus curves may each correspond to particular X and Y coordinates. For example, in one implementation the surface point P1 may be in a first region of interest (e.g., as centered in the first region of interest) of the images of the image set as corresponding to a field of view, for which the first region of interest may be associated with X and Y coordinates which also correspondingly indicate the X and Y coordinates (e.g., X1 and Y1) of the surface point P1. Similarly, the surface point P2 may be in a second region of interest (e.g., as centered in the second region of interest) of the images of the image set as corresponding to the field of view, for which the second region of interest may be associated with X and Y coordinates which also correspondingly indicate the X and Y coordinates (e.g., X2 and Y2) of the surface point P2. In some instances, the surface point P3 may be in the same region of interest as the second surface point (i.e., the second region of interest) of the images of the image set as corresponding to the field of view, and may have the same or similar X and Y coordinates (e.g., X3=X2 and Y3=Y2) as the surface point P2, but for which the surface points P2 and P3 may have different Z coordinates (e.g., Z2 and Z3, respectively). In various implementations, the Z coordinates Z2 and Z3 may be determined based on local focus peaks within a single focus curve and/or based on other known techniques.

Thus, the focus curve data, as based at least in part on an analysis of the images of the image set, indicates three dimensional positions (e.g., X, Y, Z coordinates) of a plurality of surface points on the workpiece. In the specific examples above, the focus curve data indicates three dimensional positions of the surface points P1, P2 and P3 as corresponding to determined coordinates (X1, Y1, Z1), (X2, Y2, Z2) and (X3, Y3, Z3), respectively. Additional focus curve data (e.g., corresponding to a different region of interest in a different field of view) may indicate a three dimensional position of the surface point P4 as corresponding to determined coordinates (X4, Y4, Z4) (e.g., for which the coordinate Z4 may be similar or the same as the coordinate Z1). In various implementations, a measurement related to the surface points may additionally be made based on an analysis of the focus curve data. For example, a distance between the surface points P1 and P2, or P2 and P3, may be determined based on an analysis of the focus curve data (e.g., in relation to the determined three-dimensional coordinates and known techniques for determining distances between such three-dimensional coordinates).

In certain implementations (e.g., for certain workpieces with non-planar surfaces), it may be desirable to provide illumination from multiple directions in order to better image workpiece surfaces (e.g., workpiece surfaces that are non-orthogonal to the optical axis) such as with slopes/angled surfaces, such as sidewalls (e.g., workpiece surfaces that are angled relative to, or nominally parallel with, the optical axis, etc.). The light source 230/330 (e.g., as a ring type light, or a dome type light, etc.) may provide at least part of such illumination in various implementations.

Figures 6A, 6B:
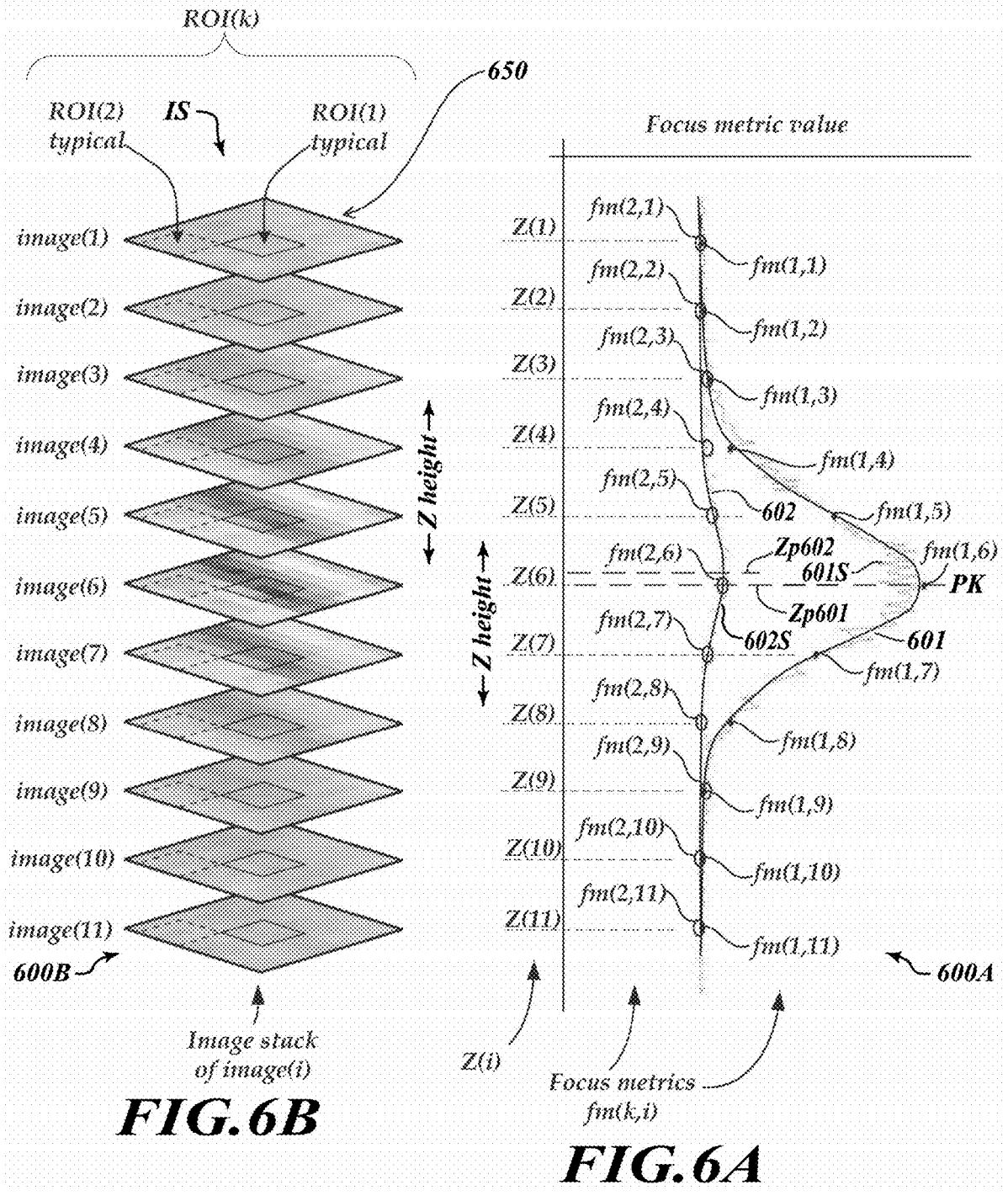
FIGS. 6A and 6B are diagrams illustrating a general image set and corresponding contrast focus curves.

FIGS. 6A and 6B are diagrams illustrating a general image set IS and corresponding contrast focus curves 601 and 602. In various implementations (e.g., as part of a points-from-focus type process), a camera 260/360 is utilized to acquire an image set comprising a plurality of images of the workpiece surface, wherein each image of the image set corresponds to different Z-height data. In some implementations (e.g., such as that of FIGS. 6A and 6B), the image set corresponds to an image stack (e.g., wherein each image of an image stack corresponds to a different Z-height). Focus curve data (e.g., for which the visible level of contrast may depend on various factors) is determined based at least in part on an analysis of the images of the image set, wherein the focus curve data indicates three dimensional positions (e.g., including Z-heights as well as relative X-axis and Y-axis positions) of a plurality of surface points on the workpiece surface.

As illustrated in FIGS. 6A and 6B, contrast focus curves 601 and 602 may result at least in part from various characteristics in corresponding regions of interest on a workpiece. It is generally desirable to obtain sufficient contrast in images so that the peak of a contrast curve can be accurately localized and reliably distinguished from noise for all desired regions of interest. Focus curve data may be determined from analysis of an image set (e.g., as part of points-from-focus (PFF) processes/measurement operations), which indicates three-dimensional positions of surface points on the surface of the workpiece.

FIGS. 6A and 6B illustrate how an image set obtained by the system may be utilized to determine the Z-heights of points on a workpiece surface. In various implementations, the image set is obtained by the system to determine three dimensional profile data (e.g., including Z-heights of points on the workpiece surface, etc.). The PFF image set may be processed to determine or output a Z-height coordinate map (e.g., a point cloud) that quantitatively indicates a set of three dimensional surface coordinates (e.g., corresponding to a surface shape or profile of at least part of the workpiece).

In the PFF analysis, each of the focus curves 601 and 602 (as shown in FIG. 6A) corresponds to a single point on the workpiece surface. That is, the peak of each focus curve indicates the Z-height of the single point along the direction of the optical axis OA (e.g., of the vision components portion of FIGS. 2 and/or 3). In various implementations, the PFF type analysis repeats this process for multiple surface points (e.g., each with a corresponding region of interest) across at least part of the workpiece surface such that a profile of at least part of the workpiece surface can be determined. In general, the process may be performed for multiple surface points that are within a field of view (i.e., as captured within the images of the image set), where for each image of the image set, a particular ROI(i) corresponds to a particular point on the workpiece surface (e.g., with the point at the center of the ROI).

FIGS. 6A and 6B are aligned relative to one another along the Z-height axis shown in the figures. FIG. 6A is a representative graph 600A illustrating two examples of fit focus curves 601 and 602, and FIG. 6B is a diagram of a variable focus image set 600B which includes two different regions of interest ROI(k), in particular ROI(1) and ROI(2), that correspond to the data points fm(1,i) and fm(2,i) corresponding to the two different focus curves 601 and 602, respectively, of FIG. 6A. The regions of interest ROI(k) are included in an imaged surface region 650 of a workpiece (e.g., as captured within a field of view).

Regarding the term "region of interest", it will be appreciated that some "single point" focus processes/tools (e.g., in some instances referenced as autofocus processes/tools) return a single Z-height corresponding to an entire region of interest. However, known "multi-point" type focus processes/tools may return multiple Z-heights corresponding to individual "sub-regions of interest" (e.g., a grid of sub-regions of interest) within a global region of interest defined by the multi-point type focus process/tool. For example, such sub-regions of interest may be manually and/or automatically defined as centered on each (or most) pixels within the global region of interest. Thus, in some cases, ROI(1) and ROI(2) may be regarded as representative sub-regions of interest within a global region of interest. However, the essential point is that a Z-height may be established for any defined focus region of interest (e.g., whether it is a region of interest of a single point focus process/tool, or a sub-region of interest within a global region of interest defined by a multi-point focus process/tool). Thus, it will be understood that when the term region of interest is used in relation to establishing a Z-height, that sub-regions of interest (e.g., within a global region of interest defined by a multi-point focus process/tool) may be encompassed within the meaning of that term. For simplicity of the current illustrations, the regions of interest ROI(1) and ROI(2) are shown to be relatively small (e.g., 3×3 pixels), although it will be appreciated that larger regions of interest (e.g., 7×7 pixels, etc.) may be utilized in various implementations as part of such processes, etc.

As shown in FIG. 6B, each of the images image(1)-image (11) of the image set image(i) include the centrally located region of interest ROI(1) for which the determined focus metric values correspond to the focus metric data points fm(1,i) on the focus curve 601. The region of interest ROI(1) is schematically indicated in FIG. 6B as including a relatively high level of contrast (e.g., in image(6)), corresponding to the relatively greater focus metric values shown on the focus curve 601. Similarly, each of the images image(1)-image(11) of the image set image(i) include the peripherally located region of interest ROI(2) for which the determined focus metric values correspond to the focus metric data points fm(2,i) on the focus curve 602. The region of interest ROI(2) is schematically indicated in FIG. 6B as including a relatively low level of contrast (e.g., in image(6)), corresponding to the relatively lesser focus metric values shown on the focus curve 602. In some instances, this may correspond to various factors, such as the region of interest ROI(2) being in or near a relative "shadow region" of the images, or otherwise in a region where little contrast is produced (e.g., and for which the region of interest ROI(1) may be in a better lighting region, or otherwise in a region where better contrast is produced).

As shown in FIG. 6A, each focus metric value fm(1,i) or fm(2,i) may be regarded as sampling continuous underlying focus data 601S or 602S, respectively. It may be seen in FIG. 6A that the underlying focus data 601S or 602S may be relatively noisy (e.g., due to the small size of the corresponding regions of interest). However, in the case of the focus curve 601, due to higher contrast in the corresponding region of interest the focus metric values in the vicinity of the focus curve peak (e.g., focus curve peak PK near Zp601) are relatively large compared to the size of the "noise component" in the underlying focus data. In comparison, in the case of the focus curve 602, due to relatively lower contrast in the corresponding region of interest the focus metric values in the vicinity of the focus curve peak (e.g., near Zp602) are closer to the size of the "noise component" in the underlying focus data. It will be appreciated that because of the low "signal to noise" associated with the lower peak of the focus curve 602, as compared to relatively high signal to noise associated with the peak of the focus curve 601, that the estimated Z-height of the focus peak Zp602 of the focus curve 602 may be less reliable or more uncertain than the estimated Z-height of the focus peak Zp601 of the focus curve 601 (e.g., in some instances the data of the focus curve 602 may be considered so unreliable and/or uncertain that no focus peak determination may reliably be made, as may be regarded as corresponding to a "gap" in the focus curve data for the workpiece surface).

Briefly summarizing in relation to FIGS. 6A and 6B, for points-from-focus type operations, a camera 260/360 (along with associated components) and/or stage 210 may move (e.g., as moved by a motor 294z), or a VFL lens 270/370 may be utilized, to vary a focus position of the system through a range of Z-height positions Z(i) along a Z-axis (e.g., the focusing axis or optical axis OA) and the camera 260/360 may be utilized to capture an image(i) at each of a plurality of corresponding focus positions. For each captured image (i), a focus metric value fm(k,i) may be calculated based on a region or sub-region of interest ROI(k) (e.g., a set of pixels) in the image and related to the corresponding focus position Z(i) (e.g., of the system as including the camera) along the Z axis at the time that the image was captured. This results in focus curve data (e.g., the focus metric values fm(k,i) at the positions Z(i), which is one type of focus peak determining data set), which may be referred to simply as a "focus curve" or "autofocus curve". In one embodiment, the focus metric values (e.g., as part of focus curve data) may involve a calculation of the contrast or sharpness of the region of interest in the image. In various embodiments, the focus values or curves may be normalized. Various focus metric calculation techniques are described in detail in the incorporated references, and various suitable focus metric functions will also be known to one of ordinary skill in the art.

The Z-height (e.g., Zp601 or Zp602) corresponding to the peak of the focus curve, which corresponds to the best focus position along the Z axis, is the Z-height for the region of interest used to determine the focus curve. The Z-height corresponding to the peak of the focus curve may be found by fitting a curve (e.g., the curve 601 or 602) to the focus curve data (e.g., the data fm(1,i) or fm(2,i)) and estimating the location of the peak of the fitted curve. It will be appreciated that while the image set IS (e.g., the image set for image(i)) is shown for purposes of illustration as only including 11 images, in various implementations (e.g., in an actual embodiment as part of a PFF process or otherwise) a larger number of images (e.g., 30, 50, 100 or 200 or more images) may be utilized. Exemplary techniques for the determination and analysis of image sets and focus curves are taught in U.S. Pat. Nos. 6,542,180 and 8,581,162, each of which is hereby incorporated herein by reference in its entirety.

In various implementations, the contrast focus curves/ focus metric values may correspond to and/or be based at least in part on a measure or indication of a difference between pixel intensity values in a region of interest of an image. Conceptually, in certain implementations and for certain workpieces that are being imaged, a region of interest in an image that is significantly out of focus may tend toward appearing significantly blurred such that the pixels in the region of interest may tend toward having approximately a same pixel intensity value (e.g., a same general gray value), such that there is very little difference between the pixel intensity values in the region of interest. Conversely, when the same region of interest is sharply in focus (e.g., at a "best focus" position), the pixels in the region of interest may have much more significant differences between the pixel intensity values. In an image set with images captured at a range of focus positions, the differences in the pixel intensity values for the region of interest may increase as the region of interest comes more into focus, and may be at a maximum or "peak" difference at a "best focus position" (e.g., as illustrated for the region of interest ROI(1) in image(6) of FIG. 6B). Such principles may be utilized to determine focus positions/Z-heights of surface points on a workpiece as part of a points-from-focus type process.

As a simplified example, for a region of interest (e.g., ROI(1)) that has an area of 3×3 pixels, a focus metric value (e.g., corresponding to a level of contrast) may be determined based at least in part on a difference between the pixel intensity value of the center pixel, and the pixel intensity values of each of the surrounding pixels. The corresponding determined focus metric value may be associated with the pixel position corresponding to the center pixel. As noted above, such calculations/determinations may be made for multiple or all of the images in an image set, for which the determined focus metric values may be part of contrast focus curve data such as may form a contrast focus curve (e.g., such as contrast focus curve 601 in FIG. 6A).

In various implementations, other techniques (e.g., for determining best focus positions for surface points of a workpiece as part of a points-from-focus type process) may also or alternatively be utilized. One such alternative technique may include, for each field of view to be imaged, acquiring a set of images for which each image may correspond to one or more different ranges of focus positions (e.g., along an optical axis direction) in accordance with the operation of the VFL lens that is controlled to vary the focus position of the metrology system. In such cases, each image is noted to correspond to different focus position data (e.g., as corresponding to the one or more different ranges of focus positions, and for which the one or more different ranges of focus positions for each image may overlap between different images in some instances). The set of images may then be analyzed for determining focus position data (e.g., as indicating a best focus position of one or more surface points on a workpiece). One technique involving capturing images corresponding to different ranges of focus positions is described in Vilar, N., Artigas, R., Duocastella, M. et al. Fast topographic optical imaging using encoded search focal scan. Nat Commun 15, 2065 (2024).

Figure 7:
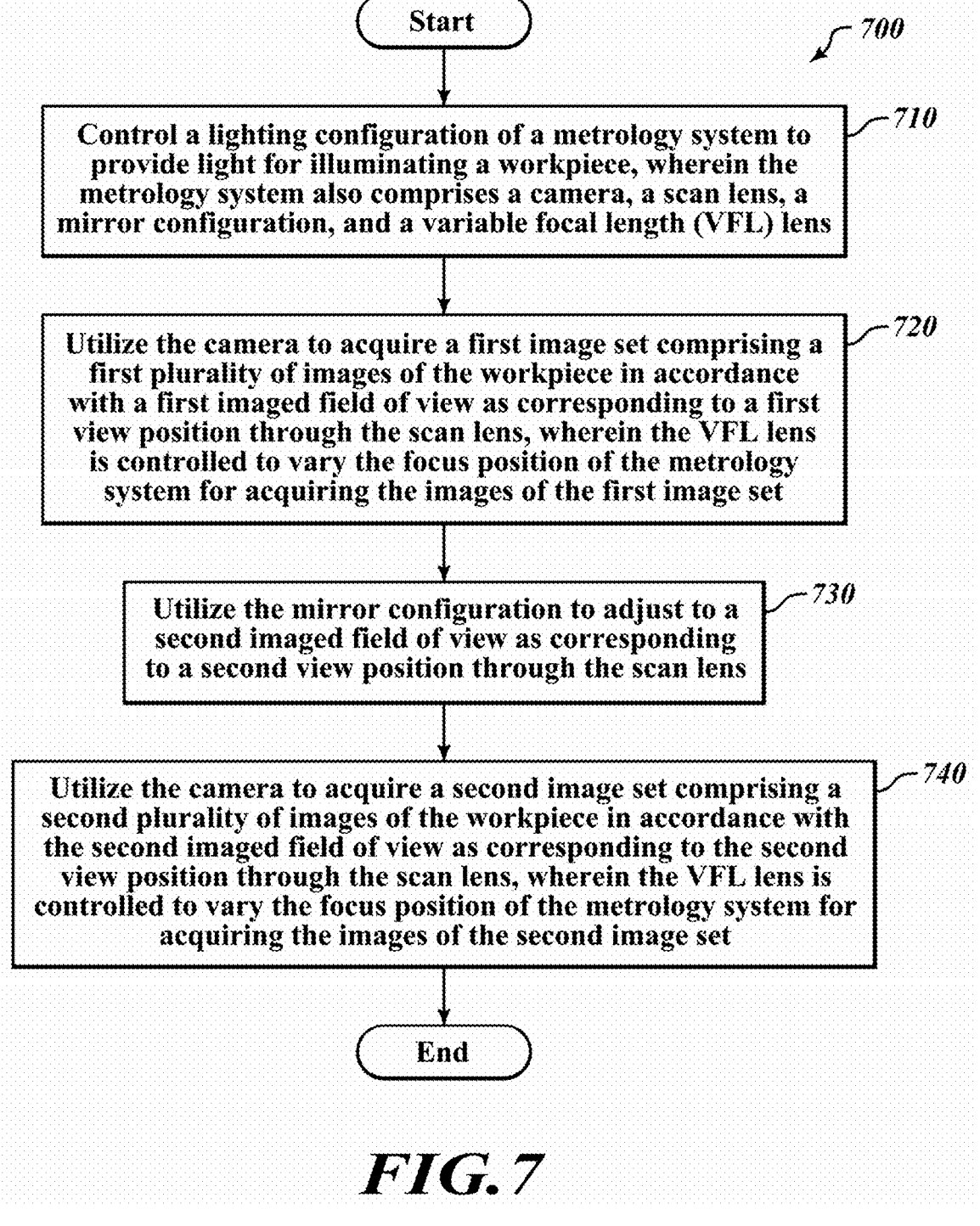
FIG. 7 is a flow diagram illustrating one exemplary implementation of a method for operating a metrology system in accordance with principles as described herein.

FIG. 7 is a flow diagram illustrating one exemplary implementation of a method 700 for operating a metrology system. At a block 710, a lighting configuration of a metrology system is controlled to provide light for illuminating a workpiece. The metrology system also comprises a camera, a scan lens, a mirror configuration, and a variable focal length (VFL) lens. At a block 720, the camera is utilized to acquire a first image set comprising a first plurality of images of the workpiece in accordance with a first imaged field of view as corresponding to a first view position through the scan lens. The VFL lens is controlled to vary the focus position of the metrology system for acquiring the images of the first image set.

At a block 730, the mirror configuration is utilized to adjust to a second imaged field of view as corresponding to a second view position through the scan lens. In various implementations, the utilizing of the mirror configuration to adjust to a second imaged field of view as corresponding to a second view position through the scan lens comprises adjusting a mirror of the mirror configuration by rotating the mirror to adjust the view position through the scan lens in an adjustment direction. At a block 740, the camera is utilized to acquire a second image set comprising a second plurality of images of the workpiece in accordance with the second imaged field of view as corresponding to the second view position through the scan lens. The VFL lens is controlled to vary the focus position of the metrology system for acquiring the images of the second image set.

In various implementations, the method may further include determining first focus position data based at least in part on an analysis of the images of the first image set, wherein the first focus position data indicates three dimensional positions of a plurality of surface points on the workpiece that are within the first field of view. The method may further include determining second focus position data based at least in part on an analysis of the images of the second image set, wherein the second focus position data indicates three dimensional positions of a plurality of surface points on the workpiece that are within the second field of view. The method may further include utilizing the first focus position data to determine three dimensional positions of a plurality of surface points on the workpiece that are within the first field of view, and utilizing the second focus position data to determine three dimensional positions of a plurality of surface points on the workpiece that are within the second field of view.

The following describes various exemplary embodiments of the present disclosure with various features and elements annotated with reference numerals found in FIGS. 1-7. It should be understood that the reference numerals are added to indicate exemplary embodiments, and the features and elements are not limited to the particular embodiments illustrated in FIGS. 1-7.

As described herein, a metrology system is provided including a lighting configuration (LC), a camera (260, 360), a scan lens (250, 350), a mirror configuration (MC), a variable focal length (VFL) lens (270, 370), one or more processors (125), and a memory (140). The camera (260, 360) is configured to receive image light (255, 355) transmitted along an imaging optical path (OPATH) and to provide images of a workpiece (20, 320) that is illuminated by the lighting configuration (LC). The scan lens (250, 350) is included in the imaging optical path (OPATH) and is configured to input image light (255, 355) arising from the workpiece (20, 320) as illuminated by the lighting configuration (LC). The mirror configuration (MC) is included in the imaging optical path (OPATH) and is configured to direct image light (255, 355) from the scan lens (250, 350) along the imaging optical path (OPATH). The mirror configuration (MC) comprises one or more mirrors (GM1, GM2) that are configured to be adjusted to adjust an imaged field of view (FOV) as corresponding to a view position (VW) through the scan lens (250, 350). The variable focal length (VFL) lens (270, 370) is included in the imaging optical path (OPATH), wherein image light (255, 355) travels from the mirror configuration (MC) along the imaging optical path (OPATH) and through the VFL lens (270, 370) to the camera (260, 360). The VFL lens (270, 370) is configured to be controlled to vary an optical power of the VFL lens (270, 370) so as to vary a focus position (EFP) of the metrology system.

The memory (140) is coupled to the one or more processors (125) and stores program instructions that when executed by the one or more processors cause the one or more processors to at least: control the lighting configuration (LC) to provide light for illuminating the workpiece (20, 320); utilize the camera (260, 360) to acquire a first image set comprising a first plurality of images of the workpiece (20, 320) in accordance with a first imaged field of view (FOV1) as corresponding to a first view position (VW1) through the scan lens (250, 350), wherein the VFL lens (270, 370) is controlled to vary the focus position (EFP) of the metrology system for acquiring the images of the first image set; utilize the mirror configuration (MC) to adjust to a second imaged field of view (FOV2) as corresponding to a second view position (VW2) through the scan lens (250, 350); and utilize the camera (260, 360) to acquire a second image set comprising a second plurality of images of the workpiece (20, 320) in accordance with the second imaged field of view (FOV2) as corresponding to the second view position (VW2) through the scan lens (250, 350), wherein the VFL lens (270, 370) is controlled to vary the focus position (EFP) of the metrology system for acquiring the images of the second image set.

In various implementations, the program instructions when executed by the one or more processors (125) further cause the one or more processors to: determine first focus position data based at least in part on an analysis of the images of the first image set, wherein the first focus position data indicates three dimensional positions of a plurality of surface points (P1, P2) on the workpiece (20, 320) that are within the first imaged field of view (FOV1); and determine second focus position data based at least in part on an analysis of the images of the second image set, wherein the second focus position data indicates three dimensional positions of a plurality of surface points (P1', P2') on the workpiece (20, 320) that are within the second imaged field of view (FOV2).

In various implementations, each image of the first image set corresponds to different focus position data in accordance with the operation of the VFL lens (270, 370) that is controlled to vary the focus position (EFP) of the metrology system; and each image of the second image set corresponds to different focus position data in accordance with the operation of the VFL lens (270, 370) that is controlled to vary the focus position (EFP) of the metrology system. In various implementations, each image of the first image set corresponds to at least one of: a different focus position (e.g., along an optical axis direction) in accordance with the operation of the VFL lens (270, 370) that is controlled to vary the focus position (EFP) of the metrology system (e.g., for which the first image set is a first image stack); or one or more different ranges of focus positions (e.g., along an optical axis direction) in accordance with the operation of the VFL lens (270, 370) that is controlled to vary the focus position (EFP) of the metrology system. In various implementations, each image of the second image set corresponds to at least one of: a different focus position (e.g., along an optical axis direction) in accordance with the operation of the VFL lens (270, 370) that is controlled to vary the focus position (EFP) of the metrology system (e.g., for which the second image set is a second image stack); or one or more different ranges of focus positions (e.g., along an optical axis direction) in accordance with the operation of the VFL lens (270, 370) that is controlled to vary the focus position (EFP) of the metrology system.

In various implementations, the metrology system further includes a VFL lens controller (180, 380) that is configured to control the VFL lens (270, 370) to periodically modulate the optical power of the VFL lens (270, 370) over a range of optical powers so as to vary the focus position (EFP) of the metrology system over a plurality of positions within a focus range (Refp). In various implementations, the VFL lens (270, 370) is a tunable acoustic gradient (TAG) lens. In various implementations, for each image of the first image set, the lighting configuration (LC) is controlled to provide at least one instance of pulsed illumination timed to correspond with a respective phase timing of a periodically modulated focus position that corresponds to a respective focus position for that respective image of the first image set (e.g., as described with respect to FIGS. 4 and 5). In addition, for each image of the second image set, the lighting configuration (LC) is controlled to provide at least one instance of pulsed illumination timed to correspond with a respective phase timing of a periodically modulated focus position that corresponds to a respective focus position for that respective image of the second image set.

In various implementations, the one or more mirrors of the mirror configuration (MC) comprise a first mirror (GM1) that is configured to be adjusted by rotating the first mirror (GM1) to adjust the view position through the scan lens (250, 350) in a first adjustment direction (e.g., that moves from the first view position (VW1) to the second view position (VW2)). In various implementations, the one or more mirrors of the mirror configuration (MC) further comprise a second mirror (GM2) that is configured to be adjusted by rotating the second mirror (GM2) to adjust the view position through the scan lens (250, 350) in a second adjustment direction that is different than the first adjustment direction (e.g., wherein the first and second adjustment directions may be orthogonal to an optical axis direction of the scan lens (250, 350), and may be orthogonal to each other, such as for adjustments in the X-axis direction and in the Y-axis direction, respectively). In various implementations, the scan lens (250, 350) is a F-theta scan lens (250, 350). In various implementations, the scan lens (250, 350) is also or alternatively a telecentric scan lens (250, 350).

In various implementations, the program instructions when executed by the one or more processors (125) further cause the one or more processors to: utilize the mirror configuration (MC) to adjust to a plurality of additional imaged fields of view (FOV3, FOV1", FOV2''', FOV3"") as corresponding to a plurality of additional view positions through the scan lens (250, 350); and for each additional imaged field of view, utilize the camera (260, 360) to acquire a corresponding image set comprising a corresponding plurality of images of the workpiece (20, 320) in accordance with the corresponding imaged field of view, wherein the VFL lens (270, 370) is controlled to vary the focus position (EFP) of the metrology system for acquiring the images of each corresponding image set (e.g., wherein each image of the corresponding image set corresponds to different focus position data in accordance with the operation of the VFL lens (270, 370) that is controlled to vary the focus position (EFP) of the metrology system). In various implementations, the program instructions when executed by the one or more processors (125) further cause the one or more processors to: for each corresponding image set, determine corresponding focus position data based at least in part on an analysis of the images of the corresponding image set, wherein the corresponding focus position data indicates three dimensional positions of a plurality of surface points on the workpiece (20, 320) that are within the corresponding field of view. In various implementations, the program instructions when executed by the one or more processors (125) further cause the one or more processors to: utilize the first focus position data to determine three dimensional positions of a plurality of surface points on the workpiece (20, 320) that are within the first imaged field of view (FOV1); and utilize the second focus position data to determine three dimensional positions of a plurality of surface points on the workpiece (20, 320) that are within the second imaged field of view (FOV2).

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system, comprising:

a lighting configuration;

a camera configured to receive image light transmitted along an imaging optical path and to provide images of a workpiece that is illuminated by the lighting configuration;

a scan lens that is included in the imaging optical path and is configured to input image light arising from the workpiece as illuminated by the lighting configuration;

a mirror configuration that is included in the imaging optical path and is configured to direct image light from the scan lens along the imaging optical path, wherein the mirror configuration comprises one or more mirrors that are configured to be adjusted to adjust an imaged field of view as corresponding to a view position through the scan lens;

a variable focal length ("VFL") lens that is included in the imaging optical path, wherein image light travels from the mirror configuration along the imaging optical path and through the VFL lens to the camera, and the VFL lens is configured to be controlled to vary an optical power of the VFL lens so as to vary a focus position of the metrology system;

one or more processors; and a memory coupled to the one or more processors and storing program instructions that when executed by the one or more processors cause the one or more processors to at least:

control the lighting configuration to provide light for illuminating the workpiece;

utilize the camera to acquire a first image set comprising a first plurality of images of the workpiece in accordance with a first imaged field of view as corresponding to a first view position through the scan lens, wherein the VFL lens is controlled to vary the focus position of the metrology system for acquiring the images of the first image set;

utilize the mirror configuration to adjust to a second imaged field of view as corresponding to a second view position through the scan lens; and utilize the camera to acquire a second image set comprising a second plurality of images of the workpiece in accordance with the second imaged field of view as corresponding to the second view position through the scan lens, wherein the VFL lens is controlled to vary the focus position of the metrology system for acquiring the images of the second image set.

2. The metrology system of claim 1, wherein the program instructions when executed by the one or more processors further cause the one or more processors to:

determine first focus position data based at least in part on an analysis of the images of the first image set, wherein the first focus position data indicates three dimensional positions of a plurality of surface points on the workpiece that are within the first field of view; and determine second focus position data based at least in part on an analysis of the images of the second image set, wherein the second focus position data indicates three dimensional positions of a plurality of surface points on the workpiece that are within the second field of view.

3. The metrology system of claim 1, wherein:

each image of the first image set corresponds to different focus position data in accordance with the operation of the VFL lens that is controlled to vary the focus position of the metrology system; and each image of the second image set corresponds to different focus position data in accordance with the operation of the VFL lens that is controlled to vary the focus position of the metrology system.

4. The metrology system of claim 1, wherein:

each image of the first image set corresponds to at least one of:

a different focus position in accordance with the operation of the VFL lens that is controlled to vary the focus position of the metrology system; or one or more different ranges of focus positions in accordance with the operation of the VFL lens that is controlled to vary the focus position of the metrology system; and each image of the second image set corresponds to at least one of:

a different focus position in accordance with the operation of the VFL lens that is controlled to vary the focus position of the metrology system; or one or more different ranges of focus positions in accordance with the operation of the VFL lens that is controlled to vary the focus position of the metrology system.

5. The metrology system of claim 1, further comprising a VFL lens controller that is configured to control the VFL lens to periodically modulate the optical power of the VFL lens over a range of optical powers so as to vary the focus position of the metrology system over a plurality of positions within a focus range.

6. The metrology system of claim 5, wherein the VFL lens is a tunable acoustic gradient ("TAG") lens.

7. The metrology system of claim 5, wherein:

for each image of the first image set, the lighting configuration is controlled to provide at least one instance of pulsed illumination timed to correspond with a respective phase timing of a periodically modulated focus position that corresponds to a respective focus position for that respective image of the first image set; and for each image of the second image set, the lighting configuration is controlled to provide at least one instance of pulsed illumination timed to correspond with a respective phase timing of a periodically modulated focus position that corresponds to a respective focus position for that respective image of the second image set.

8. The metrology system of claim 1, wherein the one or more mirrors of the mirror configuration comprise a first mirror that is configured to be adjusted by rotating the first mirror to adjust the view position through the scan lens in a first adjustment direction.

9. The metrology system of claim 8, wherein the one or more mirrors of the mirror configuration further comprise a second mirror that is configured to be adjusted by rotating the second mirror to adjust the view position through the scan lens in a second adjustment direction that is different than the first adjustment direction.

10. The metrology system of claim 1, wherein the first and second fields of view do not overlap.

11. The metrology system of claim 1, wherein the scan lens is a telecentric scan lens.

12. The metrology system of claim 1, wherein the scan lens is an F-theta scan lens.

13. The metrology system of claim 1, wherein the program instructions when executed by the one or more processors further cause the one or more processors to:

utilize the mirror configuration to adjust to a plurality of additional imaged fields of view as corresponding to a plurality of additional view positions through the scan lens; and for each additional imaged field of view, utilize the camera to acquire a corresponding image set comprising a corresponding plurality of images of the workpiece in accordance with the corresponding imaged field of view, wherein the VFL lens is controlled to vary the focus position of the metrology system for acquiring the images of each corresponding image set.

14. The metrology system of claim 13, wherein the program instructions when executed by the one or more processors further cause the one or more processors to:

for each corresponding image set, determine corresponding focus position data based at least in part on an analysis of the images of the corresponding image set, wherein the corresponding focus position data indicates three dimensional positions of a plurality of surface points on the workpiece that are within the corresponding field of view.

15. A method for operating a metrology system, the metrology system comprising:

a lighting configuration;

a camera configured to receive image light transmitted along an imaging optical path and to provide images of a workpiece that is illuminated by the lighting configuration;

a scan lens that is included in the imaging optical path and is configured to input image light arising from the workpiece as illuminated by the lighting configuration;

a mirror configuration that is included in the imaging optical path and is configured to direct image light from the scan lens along the imaging optical path, wherein the mirror configuration comprises one or more mirrors that are configured to be adjusted to adjust an imaged field of view as corresponding to a view position through the scan lens; and a variable focal length ("VFL") lens that is included in the imaging optical path, wherein image light travels from the mirror configuration along the imaging optical path and through the VFL lens to the camera, and the VFL lens is configured to be controlled to vary an optical power of the VFL lens so as to vary a focus position of the metrology system;

the method comprising controlling the lighting configuration to provide light for illuminating the workpiece;

utilizing the camera to acquire a first image set comprising a first plurality of images of the workpiece in accordance with a first imaged field of view as corresponding to a first view position through the scan lens, wherein the VFL lens is controlled to vary the focus position of the metrology system for acquiring the images of the first image set;

utilizing the mirror configuration to adjust to a second imaged field of view as corresponding to a second view position through the scan lens; and utilizing the camera to acquire a second image set comprising a second plurality of images of the workpiece in accordance with the second imaged field of view as corresponding to the second view position through the scan lens, wherein the VFL lens is controlled to vary the focus position of the metrology system for acquiring the images of the second image set.

16. The method of claim 15, further comprising:

determining first focus position data based at least in part on an analysis of the images of the first image set, wherein the first focus position data indicates three dimensional positions of a plurality of surface points on the workpiece that are within the first field of view; and determining second focus position data based at least in part on an analysis of the images of the second image set, wherein the second focus position data indicates three dimensional positions of a plurality of surface points on the workpiece that are within the second field of view.

17. The method of claim 16, further comprising:

utilizing the first focus position data to determine three dimensional positions of a plurality of surface points on the workpiece that are within the first field of view; and utilizing the second focus position data to determine three dimensional positions of a plurality of surface points on the workpiece that are within the second field of view.

18. The method of claim 15, wherein the utilizing of the mirror configuration to adjust to a second imaged field of view as corresponding to a second view position through the scan lens comprises adjusting a mirror of the mirror configuration by rotating the mirror to adjust the view position through the scan lens in an adjustment direction.

19. The method of claim 15, further comprising controlling the VFL lens to periodically modulate the optical power of the VFL lens over a range of optical powers so as to vary the focus position of the metrology system over a plurality of positions within a focus range.

20. A metrology system, comprising:

a lighting configuration;

a camera configured to receive image light transmitted along an imaging optical path and to provide images of a workpiece that is illuminated by the lighting configuration;

a scan lens that is included in the imaging optical path and is configured to input image light arising from the workpiece as illuminated by the lighting configuration;

a mirror configuration that is included in the imaging optical path and is configured to direct image light from the scan lens along the imaging optical path, wherein the mirror configuration comprises one or more mirrors that are configured to be adjusted to adjust an imaged field of view as corresponding to a view position through the scan lens; and a variable focal length ("VFL") lens that is included in the imaging optical path, wherein image light travels from the mirror configuration along the imaging optical path and through the VFL lens to the camera, and the VFL lens is configured to be controlled to vary an optical power of the VFL lens so as to vary a focus position of the metrology system;

wherein the metrology system is configured to:

control the lighting configuration to provide light for illuminating the workpiece;

utilize the camera to acquire a first image set comprising a first plurality of images of the workpiece in accordance with a first imaged field of view as corresponding to a first view position through the scan lens, wherein the VFL lens is controlled to vary the focus position of the metrology system for acquiring the images of the first image set;

utilize the mirror configuration to adjust to a second imaged field of view as corresponding to a second view position through the scan lens; and utilize the camera to acquire a second image set comprising a second plurality of images of the workpiece in accordance with the second imaged field of view as corresponding to the second view position through the scan lens, wherein the VFL lens is controlled to vary the focus position of the metrology system for acquiring the images of the second image set.

* * * * *